United States Patent
Yoshida

(10) Patent No.: US 10,442,210 B2
(45) Date of Patent: Oct. 15, 2019

(54) INKJET PRINTER

(71) Applicant: Roland DG Corporation, Hamamatsu-shi, Shizuoka (JP)

(72) Inventor: Seishin Yoshida, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/953,611

(22) Filed: Apr. 16, 2018

(65) Prior Publication Data

US 2018/0297373 A1    Oct. 18, 2018

(30) Foreign Application Priority Data

Apr. 18, 2017    (JP) ................ 2017-082146

(51) Int. Cl.
| | |
|---|---|
| H04N 1/60 | (2006.01) |
| G06T 5/00 | (2006.01) |
| B41J 2/21 | (2006.01) |
| B41J 2/155 | (2006.01) |
| H04N 1/405 | (2006.01) |

(52) U.S. Cl.
CPC ............ *B41J 2/2146* (2013.01); *B41J 2/155* (2013.01); *B41J 2/2114* (2013.01); *B41J 2/2117* (2013.01); *G06T 5/001* (2013.01); *H04N 1/4051* (2013.01); *H04N 1/6016* (2013.01); *H04N 1/6094* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,162,441 | B1 * | 10/2015 | Noda | ............... B41J 2/2132 |
| 2007/0188813 | A1 * | 8/2007 | Ozawa | ............... B41J 2/2128 |
| | | | | 358/3.21 |
| 2012/0001973 | A1 | 1/2012 | Sano | |
| 2013/0088730 | A1 * | 4/2013 | Sato | ............... H04N 1/465 |
| | | | | 358/1.9 |

(Continued)

FOREIGN PATENT DOCUMENTS

| | | |
|---|---|---|
| JP | 02-031562 A | 2/1990 |
| JP | 2007-124195 A | 5/2007 |

(Continued)

OTHER PUBLICATIONS

Yoshida, "Inkjet Printer and Printing Method", U.S. Appl. No. 15/953,610, filed Apr. 16, 2018.

(Continued)

*Primary Examiner* — Helen Zong
(74) *Attorney, Agent, or Firm* — Keating & Bennett, LLP

(57) ABSTRACT

An inkjet printer forms ink dots of a first ink and ink dots of a second ink on a recording medium. The inkjet printer performs first screen processing on image data of the second ink to generate a first dot group including the ink dots of the second ink, and performs second screen processing on image data of the second ink to generate a second dot group including the ink dots of the second ink. The inkjet printer forms a first printing layer, on the recording medium, of the ink dots of the first ink and the ink dots of the first dot group, and forms a second printing layer of the ink dots of the second ink, above or below the first printing layer.

11 Claims, 11 Drawing Sheets

(56) References Cited

U.S. PATENT DOCUMENTS

| | | | |
|---|---|---|---|
| 2013/0241988 A1* | 9/2013 | Mills | B41J 2/2117 |
| | | | 347/19 |
| 2013/0249986 A1* | 9/2013 | Maesaka | B41J 2/04588 |
| | | | 347/10 |
| 2014/0354726 A1* | 12/2014 | Heath | B41J 2/2117 |
| | | | 347/15 |
| 2014/0362416 A1 | 12/2014 | Kakutani | |
| 2015/0220824 A1 | 8/2015 | Kikuta | |
| 2018/0126747 A1* | 5/2018 | Katsuno | B41J 2/2117 |
| 2018/0259824 A1* | 9/2018 | Bouchard | G02F 1/167 |

FOREIGN PATENT DOCUMENTS

| | | |
|---|---|---|
| JP | 2007-168130 A | 7/2007 |
| JP | 2012-011752 A | 1/2012 |
| JP | 2013-067031 A | 4/2013 |
| JP | 2014-236460 A | 12/2014 |
| JP | 2015-164795 A | 9/2015 |

OTHER PUBLICATIONS

Ogura, "Inkjet Printer", U.S. Appl. No. 15/953,613, filed Apr. 16, 2018.

* cited by examiner

INKJET PRINTER

CROSS REFERENCE TO RELATED APPLICATION

This application claims the benefit of priority to Japanese Patent Application No. 2017-082146 filed on Apr. 18, 2017. The entire contents of this application are hereby incorporated herein by reference.

BACKGROUND OF THE INVENTION

1. Field of the Invention

The present invention relates to an inkjet printer.

2. Description of the Related Art

Conventionally, an inkjet printer for large format printing that includes a plurality of recording heads arrayed in a direction perpendicular to a scanning direction of a head unit is known. The inkjet printer having such a structure performs printing on a large area of a recording medium within a short time. Japanese Laid-Open Patent Publication No. 2013-67031 discloses an inkjet recording device including nine head units corresponding to nine colors of ink arrayed in the scanning direction. The nine head units each include nine recording heads arrayed in a feeding direction perpendicular to the scanning direction.

Some of recording mediums, such as cloth, paper and the like are not white. In the case in which process color ink is directly ejected onto such a non-white recording medium, the real color of the ink may not be provided. According to a technique for addressing this situation, a recording head ejecting white ink is added to the printer ejecting nine colors of ink as described in Japanese Laid-Open Patent Publication No. 2013-67031, so that the printer provides 10 colors of ink. With this technique, first, the white ink is used to form a white underlying color layer on a surface of the recording medium. After the white ink layer is formed on the recording medium, an image layer of process color ink is formed on the white ink layer. In this manner, a color close to the real color of the ink is printed even on a recording medium that is not white.

Usually, the above-described technique provides a sufficiently high level of image quality even on a recording medium that is not white. However, a still higher level of image quality may be desired for some uses of the printed item. In the field of, for example, outdoor advertisements or the like, there is a need for an image that provides a strong impression of having depth or massiveness in order to attract more attention. The human sense of vision perceives depth or thickness even on a two-dimensional image. However, often, the conventional printing method does not allow the human sense of vision to sufficiently exert this ability. A reason for this is that the image layer is thin and, thus, the influence of special color ink forming the underlying color layer is not completely eliminated. More specifically, one reason is that the maximum amount of the process color ink that is able to be printed to form the image layer is decreased because there is a limit on the amount of ink that can be accepted by the recording medium. Another reason is that the color developing property of the process color ink is decreased by the process color ink being printed on the underlying color layer. For example, in the case in which the special color ink is white ink, the image appears whitish and, thus, lacks massiveness.

SUMMARY OF THE INVENTION

Preferred embodiments of the present invention provide inkjet printers that print images that appear to have depth and/or massiveness.

An inkjet printer according to a preferred embodiment of the present invention includes a first ink head including a plurality of nozzles through which a first ink is ejected towards a recording medium to form ink dots of the first ink on the recording medium; a second ink head including a plurality of nozzles through which a second ink is ejected towards the recording medium to provide ink dots of the second ink on the recording medium; a moving mechanism moving the first ink head and the second ink head, and the recording medium, with respect to each other; and a controller connected with the first ink head, the second ink head, and the moving mechanism to control the first ink head, the second ink head, and the moving mechanism. The controller includes a first screen processor performing first screen processing on image data of the second ink to generate a first dot group of ink dots of the second ink; a second screen processor performing second screen processing on image data of the second ink to generate a second dot group of ink dots of the second ink; a third screen processor performing third screen processing on image data of the first ink to generate ink dots of the first ink; a first printing controller forming, on the recording medium, a first printing layer of the ink dots of the first ink and the ink dots of the first dot group; and a second printing controller forming a second printing layer of the ink dots of the second dot group, above or below the first printing layer.

Another inkjet printer according to a preferred embodiment of the present invention includes a first ink head including a plurality of nozzles through which a first ink is ejected towards a recording medium to provide ink dots of the first ink on the recording medium; a second ink head including a plurality of nozzles through which a second ink is ejected towards the recording medium to provide ink dots of the second ink on the recording medium; a moving mechanism moving the first ink head and the second ink head, and the recording medium, with respect to each other; and a controller connected with the first ink head, the second ink head, and the moving mechanism to control the first ink head, the second ink head, and the moving mechanism. The controller includes a first extractor performing, upon receipt of data on the ink dots of the second ink, a first extraction to extract a first dot group including a portion of, or an entirety of, the ink dots of the second ink; a second extractor performing, upon receipt of the data on the ink dots of the second ink, a second extraction to extract a second dot group including a portion of, or an entirety of, the ink dots of the second ink; a first printing controller forming, on the recording medium, a first printing layer of the ink dots of the first ink and the ink dots of the first dot group; and a second printing controller forming a second printing layer of the ink dots of the second dot group, above or below the first printing layer.

In the inkjet printers according to preferred embodiments of the present invention, the first ink and a portion of the second ink (first dot group) are concurrently printed to form the "first printing layer". Above or below the "first printing layer", another portion of the second ink (second dot group) is printed to form the "second printing layer". The second ink is printed to form the upper layer and the lower layer in an overlapping manner as described above, so that the color developing property of the second ink is inhibited or prevented from being decreased. Thus, preferred embodiments of the present invention provide images appearing to be deeper and more massive than by overlapping printing performed by the conventional printer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
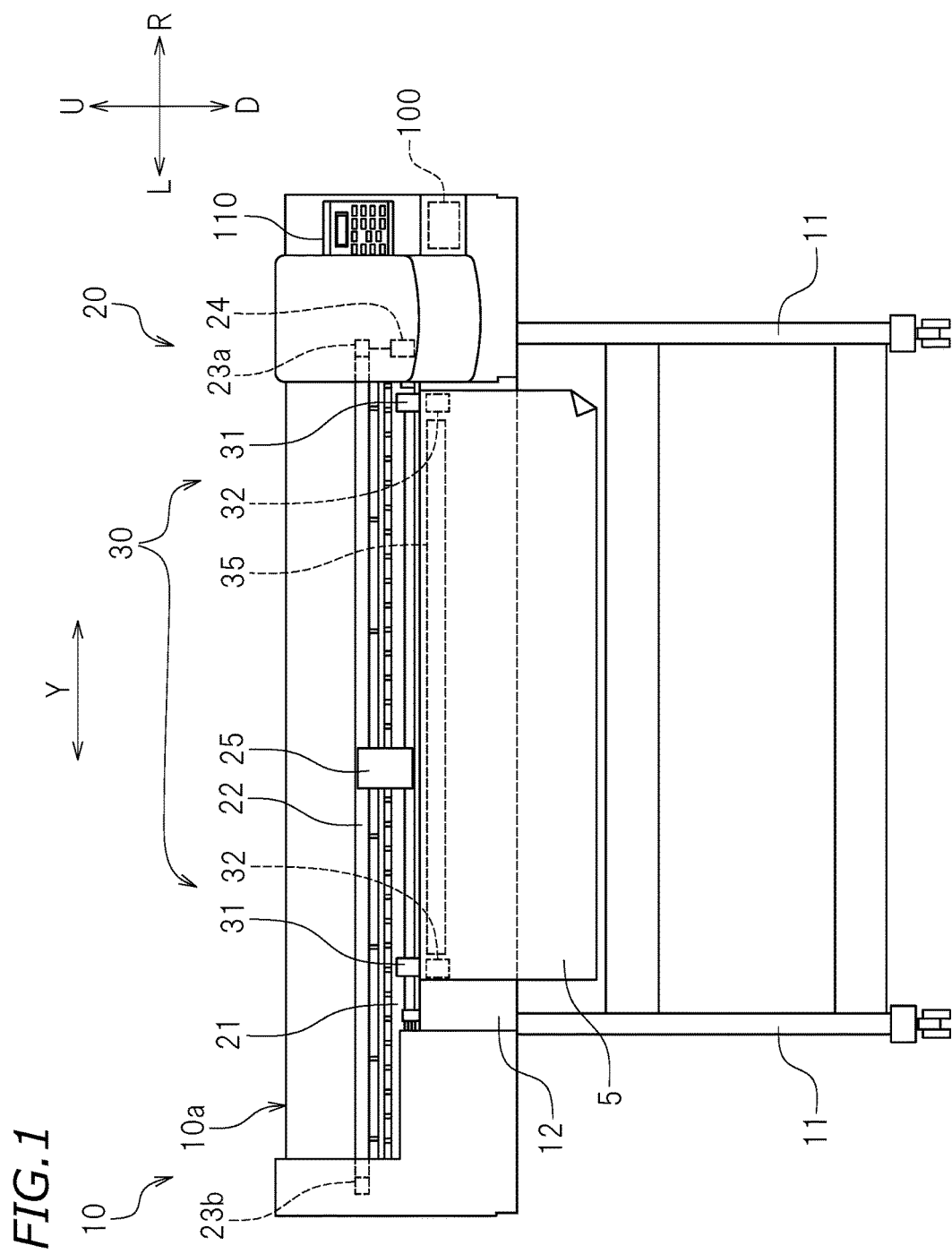
FIG. 1 is a front view of an inkjet printer according to preferred embodiment 1 of the present invention.

Hereinafter, preferred embodiments of inkjet printers according to the present invention will be described with reference to the drawings. The preferred embodiments described below are not intended to specifically limit the present invention. Components and portions that have the same functions will be denoted by the same reference signs, and overlapping descriptions will be omitted or simplified. In the following description, a direction from an inkjet printer towards a user facing a front surface of the inkjet printer is referred to as "forward", and a direction distanced from the user is referred to as "rearward". In the drawings, letter Y refers to a scanning direction, and letter X refers to a feeding direction perpendicular to the scanning direction. In the drawings, letters F, Rr, L, R, U and D respectively refer to "front", "rear", "left", "right", "up" and "down". These directions are also based on the user facing the front surface of the inkjet printer. It should be noted that these directions are provided merely for the sake of convenience, and do not limit the manner of installation of the inkjet printer in any way. The expression that one component is "above" (or "below") another component may refer to a state in which the one component is above (or below) the another component while being in direct contact with the another component, as well as a state in which the one component is above (or below) the another component with still another component provided between the one component and the another component.

Preferred Embodiment 1

FIG. 1 is a front view of a large-scale inkjet printer (hereinafter, referred to a "printer") 10 according to preferred embodiment 1 of the present invention. The printer 10 sequentially moves a roll of recording medium 5 forward (towards a downstream side X2 in the feeding direction X; see FIG. 2), while ejecting ink from a first ink head 40 and a plurality of second ink heads (see FIG. 2) mounted on a carriage 25 moving in the scanning direction Y, to print an image on the recording medium 5.

The recording medium 5 is a target on which an image is to be printed. There is no specific limitation on the type of the recording medium 5. The recording medium 5 may be, for example, paper, such as plain paper, printing paper for an inkjet printer, or other suitable paper. The recording medium 5 may be a transparent sheet made of a resin, glass, or other suitable material. The recording medium 5 may be a sheet made of a metal material, rubber or other suitable material. In the present preferred embodiment, the recording medium 5 is preferably a transparent sheet.

As shown in FIG. 1, the printer 10 includes a printer main body 10a and legs 11 supporting the printer main body 10a. The printer main body 10a extends in the scanning direction Y. The printer main body 10a includes a guide rail 21 and the carriage 25 engaged with the guide rail 21. The guide rail 21 extends in the scanning direction Y. The guide rail 21 guides the carriage 25 such that the carriage 25 moves in the scanning direction Y. An endless belt 22 is secured to the carriage 25. The belt 22 is wrapped around, and extends between, a pulley 23a provided at a right end of the guide rail 21 and a pulley 23b provided at a left end of the guide rail 21. A carriage motor 24 is attached to the right pulley 23a. The carriage motor 24 is electrically connected with a controller 100. The carriage motor 24 is controlled by the controller 100. When the carriage motor 24 is driven, the pulley 23a is rotated to run the belt 22. As a result, the carriage 25 moves in the scanning direction Y along the guide rail 21. Along with the movement of the carriage 25 in the scanning direction Y, the first ink head 40 and the second ink heads 50 also move in the scanning direction Y. In the present preferred embodiment, the belt 22, the pulley 23a, the pulley 23b, and the carriage motor 24 are included in an example of carriage moving mechanism 20 moving the carriage 25, and the first ink head 40 and the second ink heads 50 mounted on the carriage 25, in the scanning direction Y.

A platen 12 is located below the carriage 25. The platen 12 extends in the scanning direction Y. The recording medium 5 is to be placed on the platen 12. Pinch rollers 31 pressing the recording medium 5 from above are provided above the platen 12. The pinch rollers 31 are located to the rear of the carriage 25. The platen 12 is provided with grit rollers 32. The grit rollers 32 are located below the pinch rollers 31. The grit rollers 32 are located at a position facing the pinch rollers 31. The grit rollers 32 are coupled with a feed motor 33 (see FIG. 3). The grit rollers 32 are rotatable upon receipt of a driving force of the feed motor 33. The feed motor 33 is electrically connected with the controller 100. The feed motor 33 is controlled by the controller 100. When the grit rollers 32 are rotated in the state in which the recording medium 5 is held between the pinch rollers 31 and the grit rollers 32, the recording medium 5 is fed in the feeding direction X. In the present preferred embodiment, the pinch rollers 31, the grit rollers 32, and the feed motor 33 are included in an example of the feeding mechanism 30 moving the recording medium 5 in the feeding direction X. The feeding mechanism 30 and the carriage moving mechanism 20 are included in a moving mechanism moving the recording medium 5 and the carriage 25 with respect to each other.

Figure 2:
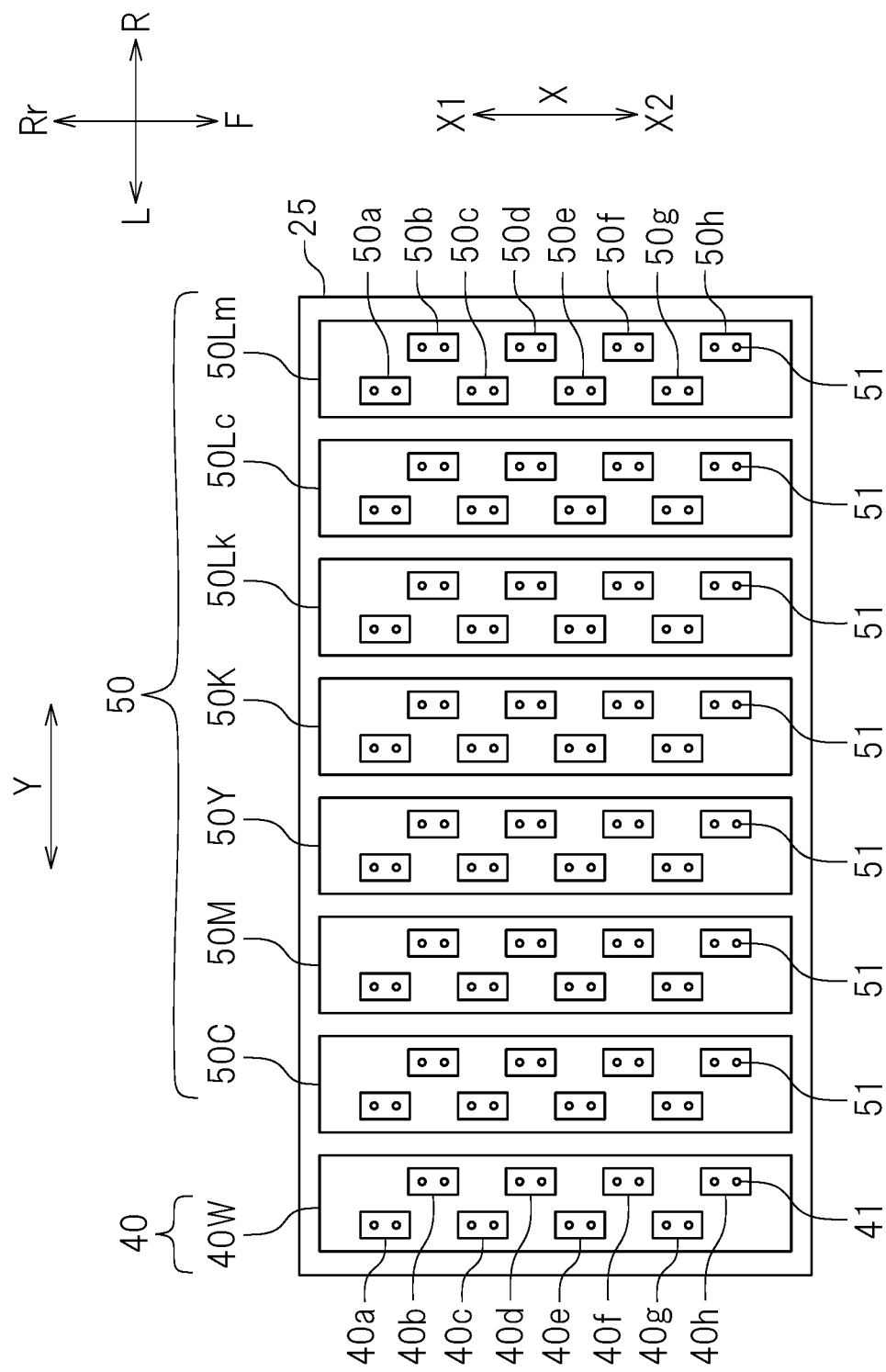
FIG. 2 is a schematic view showing a structure of a bottom surface of a carriage according to preferred embodiment 1 of the present invention.

FIG. 2 is a schematic view showing a structure of a surface of the carriage 25 that faces the recording medium 5 (in the present preferred embodiment, a bottom surface of the carriage 25). As shown in FIG. 2, the carriage 25 holds, at the bottom surface, the first ink head 40 and the second ink heads 50. The first ink head 40 includes one ink head 40W (the ink head 40W may also be referred to as the "first ink head 40W"). The plurality of second ink heads 50 include ink heads 50C, 50M, 50Y, 50K, 50Lk, 50Lc and 50Lm. As shown in FIG. 2, the first ink head 40W and the second ink heads 50C through 50Lm are located side by side in the scanning direction Y.

In the present preferred embodiment, the first ink head 40 ejects special color ink that changes the color tone or the design of a color image. The special color ink is an example of "first ink". In this example, the ink head 40W included in the first ink head 40 preferably ejects white ink. The color tone of the special color ink is not limited to white. The "special color ink" encompasses ink other than the process color ink such as C ink, M ink, Y ink, K ink or other process color inks, for example, metallic ink, such as silver ink, gold ink or other metallic inks, and transparent ink, for example. In the present preferred embodiment, the first ink head 40 preferably includes one ink head, for example. The number of the ink head(s) included in the first ink head 40 is not limited to one. The number of the ink heads included in the first ink head 40 may be two or more. There is no limitation on the color tone of the special color ink. The first ink head 40 may eject, for example, metallic ink, such as silver ink, gold ink or other metallic inks, or transparent ink.

As shown in FIG. 2, the ink head 40W included in the first ink head 40 preferably includes eight sub ink heads 40a through 40h, for example. The eight sub ink heads 40a through 40h each include a plurality of nozzles 41, through which the ink is ejected. The plurality of nozzles 41 are arrayed in one line in the feeding direction X in each sub ink head. The sub ink heads 40a through 40h preferably include the same number of nozzles 41 with each other. The positional arrangement of the nozzles 41 in each sub ink head is not limited to the above-described positional arrangement. The sub ink heads 40a through 40h do not need to include the same number of nozzles 41 with each other. In FIG. 2, the sub ink heads 40a through 40h are each shown as including two nozzles 41. In actuality, the sub ink heads 40a through 40h each include a larger number of (e.g., 40) nozzles 41. There is no limitation on the number of the nozzles 41 included in the sub ink heads 40a through 40h.

In the ink head 40W, the eight sub ink heads 40a through 40h are preferably located in a staggered arrangement. More specifically, the eight sub ink heads 40a through 40h are arrayed in this order from an upstream side X1 in the feeding direction X towards the downstream side X2 and provided in two lines, namely, a left line and a right line. Among the eight sub ink heads 40a through 40h, the sub ink heads 40a, 40c, 40e and 40g are arrayed in one line in the feeding direction X. To the right of the sub ink heads 40a, 40c, 40e and 40g, the sub ink heads 40b, 40d, 40f and 40h are arrayed in one line in the feeding direction X. The sub ink heads 40a through 40h are located alternately in the left line and the right line. The sub ink heads 40a through 40h are located intermittently as described above, but are continuous in the feeding direction X if the left line and the right line are considered as being combined together. In an actual ink head, the sub ink heads may be located while overlapping each other partially in the feeding direction X such that the nozzles 41 are located continuously in the feeding direction X.

The ink heads 50C through 50Lm provided as the second ink heads 50 each eject process color ink to produce a color image. The process color ink is an example of "second ink". In the present preferred embodiment, preferably, the ink head 50C ejects cyan ink. The ink head 50M ejects magenta ink. The ink head 50Y ejects yellow ink. The ink head 50K ejects black ink. The ink head 50Lk ejects gray ink. The ink head 50Lc ejects light cyan ink. The ink head 50Lm ejects light magenta ink. The number of the second ink heads is not limited to seven. There is no limitation on the color tone of the process color ink.

As shown in FIG. 2, the seven ink heads 50C, 50M, 50Y, 50K, 50Lk, 50Lc and 50Lm provided as the second ink heads 50 each include eight sub ink heads 50a through 50h. The eight sub ink heads 50a through 50h each include a plurality of nozzles 51, through which the ink is ejected. The plurality of nozzles 51 are arrayed in one line in the feeding direction X in each sub ink head. The nozzles 51 in the ink heads 50C, 50M, 50Y, 50K, 50Lk, 50Lc and 50Lm are arrayed at positions matched, in the feeding direction X, to the positions of the nozzles 41 in the ink head 40W. The number of the nozzles 51 included in each of the sub ink heads 50a through 50h is preferably equal or substantially equal to the number of the nozzles 41 included in each of the sub ink heads 40a through 40h. The positional arrangement of the nozzles in each sub ink head is not limited to the above-described positional arrangement. The sub ink heads 50a through 50h do not need to include the same number of nozzles 51 with each other.

In the seven ink heads 50C through 50Lm provided as the second ink heads 50 are arrayed in the same or substantially the same manner as in the first the ink head 40W. That is, the sub ink heads 50a through 50h are arrayed in this order from the upstream side X1 toward the downstream side X2 in the feeding direction X and are provided in two lines, that is, a left line and a right line. More specifically, the sub ink heads 50a, 50c, 50e and 50g are arrayed in the left line, and the sub ink heads 50b, 50d, 50f and 50h are arrayed in the right line. In the second ink heads 50 also, the sub ink heads 50a through 50h are located continuously in the feeding direction X if the left line and the right line are considered as being combined together.

The ink head 40W and the ink heads 50C through 50Lm each include actuators (not shown), each including a piezoelectric element and other components, provided therein. The actuators are electrically connected with the controller 100. The actuators are controlled by the controller 100. The actuators are driven, and as a result, the ink is ejected towards the recording medium 5 from the nozzles 41 of the ink head 40W and the nozzles 51 of the ink heads 50C through 50Lm.

The ink head 40W included in the first ink head 40 and the ink heads 50C through 50Lm provided as the second ink heads 50 are each in communication with an ink cartridge (not shown) via an ink supply path (not shown). The ink cartridge is detachably located at, for example, a right end of the printer main body 10a. There is no limitation on the material of the ink, and any of various materials conventionally used as an ink material for an inkjet printer is usable. The ink may preferably be, for example, solvent-based pigment ink or aqueous pigment ink. Alternatively, the ink may be aqueous dye ink, ultraviolet-curable pigment ink cured upon receipt of ultraviolet rays, or other suitable ink.

As shown in FIG. 1, the printer 10 includes a heater 35. The heater 35 is provided below the platen 12. The heater 35 is located towards the front of the grit rollers 32. The heater 35 heats the platen 12. The platen 12 is heated, so that the recording medium 5 placed on the platen 12 and the ink that has landed on the recording medium 5 are heated. Thus, the drying of the ink is promoted. The heater 35 is electrically connected with the controller 100. The temperature to which the heater 35 is heated is controlled by the controller 100.

Figure 3:
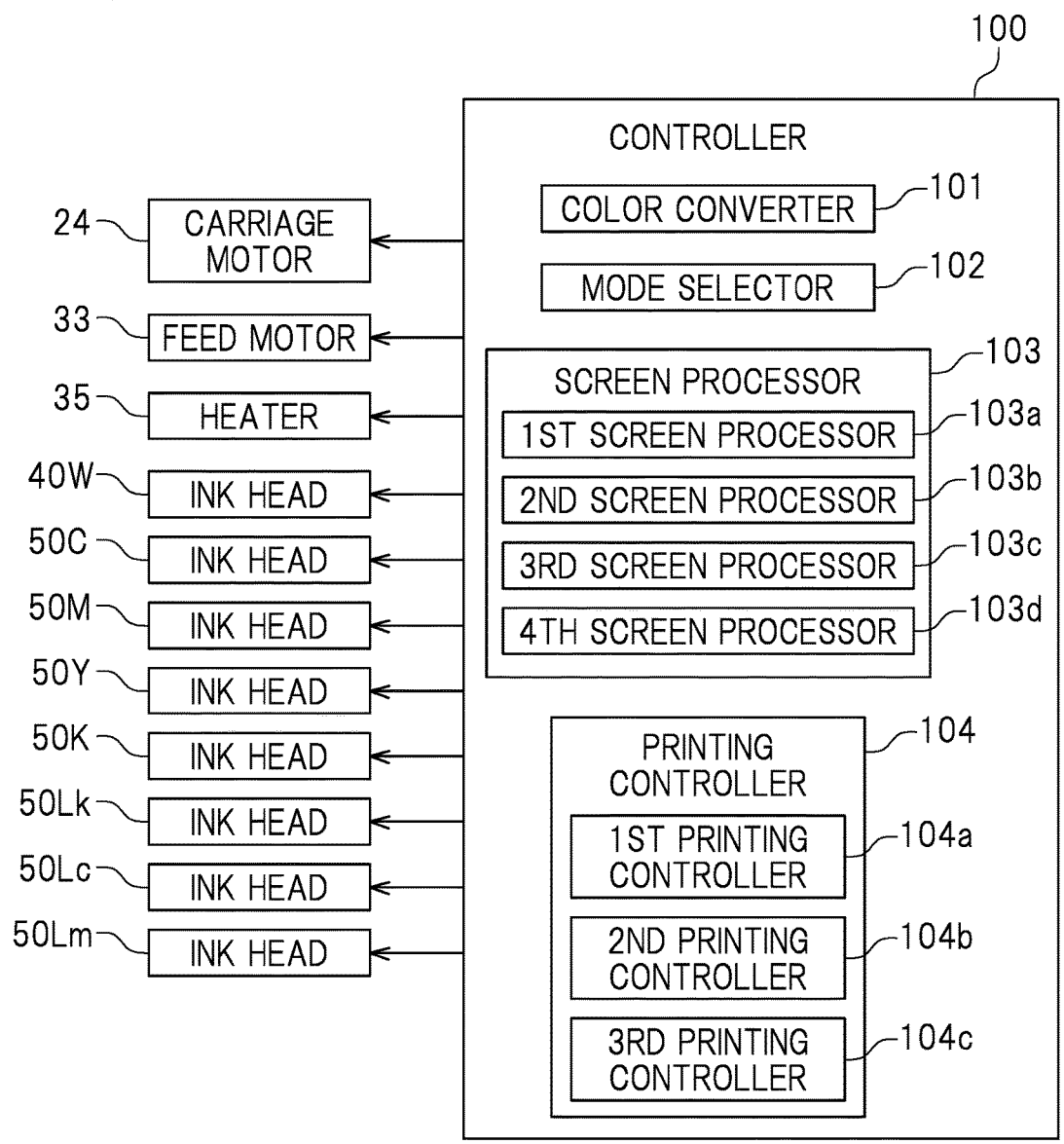
FIG. 3 is a block diagram of the printer according to preferred embodiment 1 of the present invention.

As shown in FIG. 1, an operation panel 110 is provided at the right end of the printer main body 10a. The operation panel 110 includes a display that displays a state of the printer 10, input keys operable by the user, and other controls. The controller 100 is configured and/or programmed to control various operations of the printer 10 and is accommodated in the operation panel 110. FIG. 3 is a block diagram of the printer 10 according to the present preferred embodiment. As shown in FIG. 3, the controller 100 is communicably connected with, and is configured and/or programmed to control, the feed motor 33, the carriage motor 24, the heater 35, the ink head 40W of the first ink head 40, and the ink heads 50C through 50Lm provided as the second ink heads 50. The controller 100 is configured and/or programmed to include a color converter 101, a mode selector 102, a screen processor 103, and a printing controller 104. The screen processor 103 includes a first screen processor 103a, a second screen processor 103b, a third screen processor 103c, and a fourth screen processor 103d. The printing controller 104 includes a first printing controller 104a, a second printing controller 104b, and a third printing controller 104c.

There is no specific limitation on the structure of the controller 100. The controller 100 is preferably, for example, a microcomputer. There is no specific limitation on the hardware structure of the microcomputer. The microcomputer includes, for example, an interface (I/F) receiving printing data or other data from an external device, such as a host computer or other suitable device, a central processing unit (CPU) executing a command of a control program, a ROM (read only memory) including, stored thereon, the program executable by the CPU, a RAM (random access memory) usable as a working area in which the program is developed, and a storage, such as a memory or other suitable storage, storing the program and various types of data. The controller 100 does not need to be provided inside the printer main body 10a. The controller 100 may be, for example, a computer that is located outside of the printer main body 10a and is communicably connected with the printer main body 10a in a wired or wireless manner.

The color converter 101 converts an input image including the three RGB colors or the four CMYK colors into image data of seven colors of C (cyan), M (magenta), Y (yellow), K (black), Lk (gray), Lc (light cyan) and Lm (light magenta). Such conversion is performed based on an ICC profile. There are ICC profiles of different types. For example, color conversion performed on an input image including the same three colors by use of different ICC profiles results in seven-color image data of different color tones. Such ICC profiles include, for example, an ICC profile converting an input image to seven-color image data that is suitable for photo printing, an ICC profile converting an input image to seven-color image data that is suitable for graphic printing, and the like. In the present preferred embodiment, the color converter 101 uses one ICC profile.

The mode selector 102 is used to select a printing mode. In the present preferred embodiment, the printing mode is classified into "normal printing" and "overlapping printing". The "overlapping printing" is classified into "first overlapping printing" and "second overlapping printing". According to the "first overlapping printing", an underlying color layer is provided as a lower layer of the special color ink, and an image layer is provided as an upper layer of the process color ink. According to the "second overlapping printing", an image layer is provided as a lower layer of the process color ink, and an underlying color layer is provided as an upper layer of the special color ink. The "first overlapping printing" and the "second overlapping printing" will be described in detail below. When the "first overlapping printing" mode is selected, the mode selector 102 instructs the first printing controller 104a and the second printing controller 104b to perform the "first overlapping printing". When the "second overlapping printing" mode is selected, the mode selector 102 instructs the first printing controller 104a and the second printing controller 104b to perform the "second overlapping printing". When the "normal printing" mode is selected, the mode selector 102 instructs the third printing controller 104c to perform the "normal printing". The printing mode may be incorporated in advance into the printing data and automatically selected. Alternatively, the printing mode may be selected appropriately by an operator.

The screen processor 103 performs screen processing. The screen processing is a process of converting image data into an ink dot pattern. A printed image provided by an inkjet printer is an assembly of ink dots of various colors of process color ink. In the case of the printer 10 according to the present preferred embodiment, image data based on which the screen processing is performed is the seven-color image data created by the color converter 101. Such image data is converted by the screen processor 103 into an ink dot pattern of seven colors of cyan, magenta, yellow, black, gray, light cyan and light magenta. In the screen processor 103, the first screen processor 103a performs "first screen processing" on the image data of the process color ink to generate a "first dot group" of ink dots of the process color ink. The second screen processor 103b performs "second screen processing" on the image data of the process color ink to generate a "second dot group" of ink dots of the process color ink. The screen processor 103 in the present preferred embodiment generates the two ink dot patterns, that is, the "first dot group" and the "second dot group" from one piece of image data of the process color ink. The "first dot group" and the "second dot group" will be described in detail below. The special color ink, which is preferably white ink only in the present preferred embodiment, is also subjected to screen processing, that is, is converted into an ink dot pattern. In the screen processor 103 in the present preferred embodiment, the third screen processor 103c performs screen processing on the special color ink. The fourth screen processor 103d performs screen processing on the image data of the process color ink in the case in which the "overlapping printing" is not to be performed, more specifically, the "normal printing" is to be performed.

The printing controller 104 controls the printing operation. The printing controller 104 is connected with the carriage motor 24, the feed motor 33, the first ink head 40W, and the second ink heads 50C through 50Lm. The printing controller 104 controls these components to perform printing. The printing controller 104 controls the temperature of the heater 35 to promote the drying of the ink after the ejection.

In the printing controller 104, the first printing controller 104a controls a concurrent printing operation of a work of printing an image of the "first dot group" and a work of printing an underlying color of the special color ink. Hereinafter, a printing layer provided by the above-described concurrent printing operation may be referred to as a "first printing layer". The "first printing layer" is an underlying color layer including a portion of an image including the process color ink mixed therein. The first printing controller 104a controls the carriage motor 24, the feed motor 33, the first ink head 40W, and the second ink heads 50C through 50Lm to perform the concurrent printing operation of printing the image of the "first dot group" and the underlying color of the special color ink. The first printing controller 104a controls the carriage motor 24, the feed motor 33, the first ink head 40W, and the second ink heads 50C through 50Lm in a different manner in accordance with which of the "first overlapping printing" and the "second overlapping printing" is selected by the mode selector 102. More specifically, when the "first overlapping printing" is selected by the mode selector 102, the first printing controller 104a controls the components such that the "first printing layer" is provided as the lower layer. By contrast, when the "second overlapping printing" is selected by the mode selector 102, the first printing controller 104a controls the components such that the "first printing layer" is provided as the upper layer. The details of the control will be described below.

In the printing controller 104, the second printing controller 104b controls a printing work of printing an image of "second dot group". Hereinafter, a printing layer provided by such printing may be referred to as a "second printing layer". The "second printing layer" is an image layer. The "second printing layer" is provided by the second printing controller 104b above or below the "first printing layer". When the "first overlapping printing" is selected by the mode selector 102, the second printing controller 104b performs the printing (formation of the "second printing layer") above the "first printing layer". By contrast, when the "second overlapping printing" is selected by the mode selector 102, the "second printing layer" is provided below the "first printing layer". The second printing controller 104b controls the carriage motor 24, the feed motor 33, and the second ink heads 50C through 50Lm to provide the image of the "second dot group". The details of the control will be described below.

When the "normal printing" is selected by the mode selector 102, the third printing controller 104c controls the carriage motor 24, the feed motor 33, and the second ink heads 50C through 50Lm to perform the "normal printing" on the recording medium 5.

According to the "normal printing", one layer is printed on the recording medium 5. For the "normal printing", only the process color ink is used. In the "normal printing", the ink dots of the process color ink generated by the fourth screen processor 103d is printed. The "normal printing" is performed as follows. The third printing controller 104c drives the carriage motor 24 to move the carriage 25 in the scanning direction Y. The third printing controller 104c drives the actuators to cause the second ink heads 50 to eject the ink, so that the process color ink lands on a printing surface of the recording medium 5. In addition, the third printing controller 104c controls the feed motor 33 such that the recording medium 5 is sequentially fed forward (F) (towards the downstream side X2 in the feeding direction X). The ink on the recording medium 5 fed by the feed motor 33 is sequentially heated by the heater 35 and, thus, is dried. The third printing controller 104c, for example, moves the carriage 25 in the scanning direction Y once or a plurality of times by the time when the recording medium 5 is fed forward (F) once.

In the overlapping printing modes including the "first overlapping printing" mode and the "second overlapping printing" mode, an underlying color layer and an image layer are formed in an overlapping manner on the recording medium 5. In the case in which the recording medium 5 is not white as in the present preferred embodiment (in the present preferred embodiment, the recording medium 5 is preferably transparent), such overlapping printing is often performed on a recording medium. Often, the process color ink ejected directly onto a recording medium that is not white does not develop the real color thereof. Therefore, first, a white ink layer is printed on the recording medium, and then, an image is printed on the white ink layer. In this manner, a color close to the real color of the ink is printed even on a recording medium that is not white. The overlapping printing is also performed in a case other than the above-described case. For example, a special color ink layer of transparent ink, metallic ink, or other suitable ink may be provided above or below the image, so that a specific visual effect is provided. In the case in which the recording medium 5 is a transparent sheet as in the present preferred embodiment, the overlapping printing is performed primarily to provide the image with an underlying color (in this preferred embodiment, preferably white). For a printed item, a printing surface of which is to be viewed, the special color ink layer is preferably provided below the image. For a printed item, a surface opposite to the printing surface of which is to be viewed, the special color ink layer is preferably provided above the image.

For the overlapping printing, there are needs for a higher image quality. In the field of, for example, outdoor advertisements, there is a need for an image providing a strong impression of having depth and/or massiveness in order to attract more attention. However, often, the conventional printing method does not sufficiently fulfill such a need. A reason for this is that the image layer is thin and, thus, the influence of special color ink providing the underlying color layer is not completely eliminated. More specifically, one reason is that the maximum amount of the process color ink that is able to be printed to provide the image layer is decreased because there is a limit on the amount of ink that is able to be accepted by the recording medium. Another reason is that the color developing property of the process color ink is decreased by the process color ink being printed on the underlying color layer. For example, in the case in which the special color ink is white ink as in the present preferred embodiment, the image appears whitish and, thus, lacks depth and/or massiveness.

In order to address with such a situation, the controller 100 in the present preferred embodiment includes the first screen processor 103a and the second screen processor 103b in the screen processor 103 and also includes the first printing controller 104a and the second printing controller 104b in the printing controller 104. The first screen processor 103a performs the "first screen processing" on the image data of the process color ink to generate the "first dot group" of the ink dots of the process color ink. The second screen processor 103b performs the "second screen processing" on the image data of the process color ink to generate the "second dot group" of the ink dots of the process color ink. The first printing controller 104a provides the "first printing layer", on the recording medium 5, of the ink dots of the special color ink and the ink dots of the "first dot group". The expression that the "first printing layer" is provided "on" the recording medium 5 does not necessarily indicate that the "first printing layer" is provided in contact with the recording medium 5, and encompasses a case in which another printing layer (e.g., "second printing layer") is provided between the "first printing layer" and the recording medium 5. The second printing controller 104b provides the "second printing layer" of the ink dots of the "second dot group", above or below the "first printing layer". In the case in which the "first printing layer" is provided as the lower layer whereas the "second printing layer" is provided as the upper layer, the "first overlapping printing" has been selected by the mode selector 102. In the case in which the "second printing layer" is provided as the lower layer whereas the "first printing layer" is provided as the upper layer, the "second overlapping printing" has been selected by the mode selector 102.

As described above, the printer 10 according to the present preferred embodiment concurrently prints the underlying color layer and the ink dots of the process color generated as the "first dot group", to provide the "first printing layer". That is, the image is mixed in the underlying layer. The printer 10 according to the present preferred embodiment further prints the ink dots of the process color generated as the "second dot group" to provide the "second printing layer" above or below the "first printing layer". With this arrangement, the color developing property of the process color ink is inhibited or prevented from being decreased, and a color close to the real color of the process color ink is provided. Therefore, the printer 10 according to the present preferred embodiment is able to provide an image appearing to be deeper and more massive than by overlapping printing performed by the conventional printer.

In the case in which the recording medium is transparent, the image of the printed item provided by the printer 10 according to the present preferred embodiment is visually recognizable also from the side of the underlying color layer. In the case in which the printing is performed on a transparent recording medium with the conventional overlapping printing, the level of the light blocking property of the underlying color layer is increased in order to provide a clear image. That is, the underlying color layer is thick or has a high density. However, in the state in which the level of the light blocking property of the underlying color layer is increased, the image is not visually recognizable from the side of the underlying color layer. This may cause a problem in position alignment in, for example, a bonding process in which a plurality of recording mediums need to be positionally aligned. The printer 10 according to the present preferred embodiment is able to provide a printed item allowing the image to be visually recognizable from the side of the underlying color layer while the level of the light blocking property of the underlying color layer is maintained high.

Hereinafter, a process of generating the "first dot group" and the "second dot group" and a process of "overlapping printing" performed by the printer 10 according to the present preferred embodiment will be described. First, a process of generating the "first dot group" and the "second dot group" from the image data of the process color ink will be described.

Figure 4:
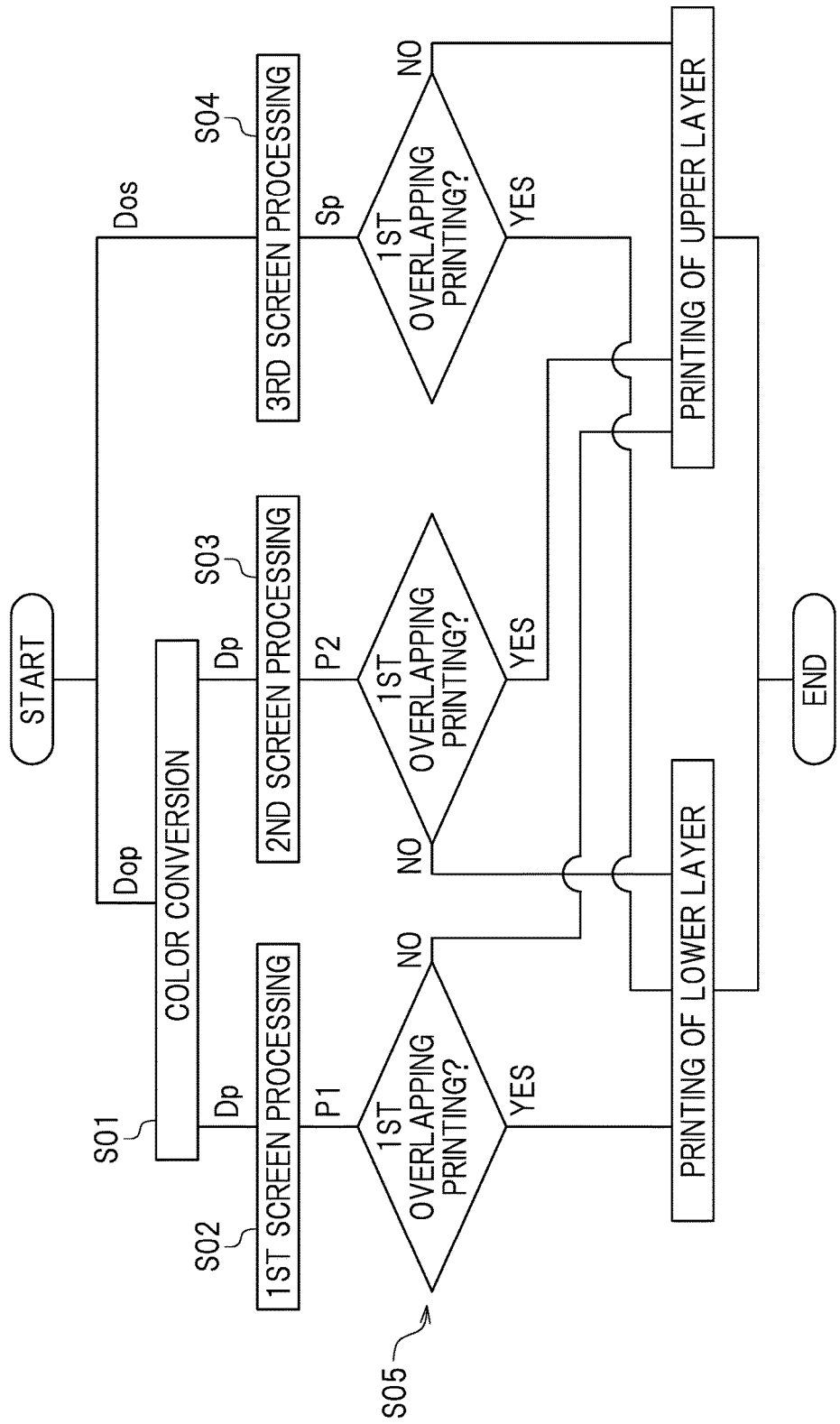
FIG. 4 is a flowchart of image processing according to preferred embodiment 1 of the present invention.

FIG. 4 is a flowchart of image processing in the present preferred embodiment. The flowchart shown in FIG. 4 is directed to the "overlapping printing". A process of "normal printing" is not shown. As shown in FIG. 4, an input image Dop of the process color ink is converted into seven-color image data Dp by the "color conversion" in step S01. The "color conversion" in step S01 is performed by the color converter 101. The image data Dp of seven colors of process color ink provided by the conversion in step S01 is subjected to the screen processing in steps S02 and S03. In step S02, the "first screen processing" is performed by the first screen processor 103a. In step S03, the "second screen processing" is performed by the second screen processor 103b. As a result of the "first screen processing" in step S02, a first dot group P1 is generated. As a result of the "second screen processing" in step S03, a second dot group P2 is generated. In the present preferred embodiment, the "first screen processing" in step S02 and the "second screen processing" in step S03 are different processes. More specifically, the "first screen processing" in step S02 is preferably screen processing performed by a dithering method, for example. The "second screen processing" in step S03 is preferably screen processing performed by an error diffusion method, for example.

The dithering method is one of pseudo gradation expressing algorithms. According to screen processing, each ink dot of image data of each color of process color ink is turned ON or OFF. More specifically, the screen processing is performed by the dithering method as follows. A printing region of the image data includes microscopic regions. When an ink value of such a microscopic region of the image data is higher than, or equal to, a defined threshold value, the ink dot in this region is turned ON. By contrast, when the ink value of this region of the image data is lower than the defined threshold value, the ink dot in this region is turned OFF. For example, according to the simplest dithering method, that is, the binary dithering method, the image data is divided into an ON region and an OFF region by one threshold value. In this case, the post-screen processing image is a rough image as a result of preciseness being lost from the original image. The dithering method is not limited to the binary dithering method. The dithering method includes an ordered dithering method using a matrix of assigned threshold values, a random dithering method of setting threshold values randomly within a certain range, and other suitable dithering methods. Screen processing using the dithering method tends to result in formation of an ink dot pattern with slight dispersion, but does not require a large amount of calculation. That is, the load imposed on the controller 100 by the screen processing is relatively light.

The error diffusion method is also one of the pseudo gradation expressing algorithms. The error diffusion method provides a better image quality, but imposes a heavier load on the controller 100, than the dithering method. The error diffusion method is performed as follows. It is determined whether each ink dot is turned ON or OFF, and then the error caused at the position of this dot from the original image is diffused to the dots around this dot. In this manner, the unnaturalness caused by the screen processing is reduced or prevented. Therefore, the screen processing by the error diffusion method provides a better image quality, but imposes a heavier load, than the screen processing by the dithering method.

As described above, the first screen processor 103a and the second screen processor 103b preferably perform different types of screen processing. The ink dots of the process color ink generated by the "first screen processing" (dithering method) performed by the first screen processor 103a provide the first dot group P1. The ink dots of the process color ink generated by the "second screen processing" (error diffusion method) performed by the second screen processor 103b provide the second dot group P2.

An input image Dos of the special color ink is also subjected to screen processing (step S04) by the third screen processor 103c and is converted into a pattern of special color ink dots Sp. There is no limitation on the method of the "third screen processing" performed on the special color ink. For example, the dithering method may be used.

In step S05, it is determined which one of the upper layer and the lower layer is to be formed of the special color ink dots Sp and the first dot group P1, and which one of the upper layer and the lower layer is to be formed of the second dot group P2. In the case in which the "first overlapping" is selected by the mode selector 102 (YES in step S05), the special color ink dots Sp and the first dot group P1 are printed to provide the lower layer, and the second dot group P2 is printed to provide the upper layer. By contrast, in the case in which the "second overlapping" is selected by the mode selector 102 (NO in step S05), the second dot group P2 is printed to provide the lower layer, and the special color ink dots Sp and the first dot group P1 are printed to provide the upper layer.

Figure 5:
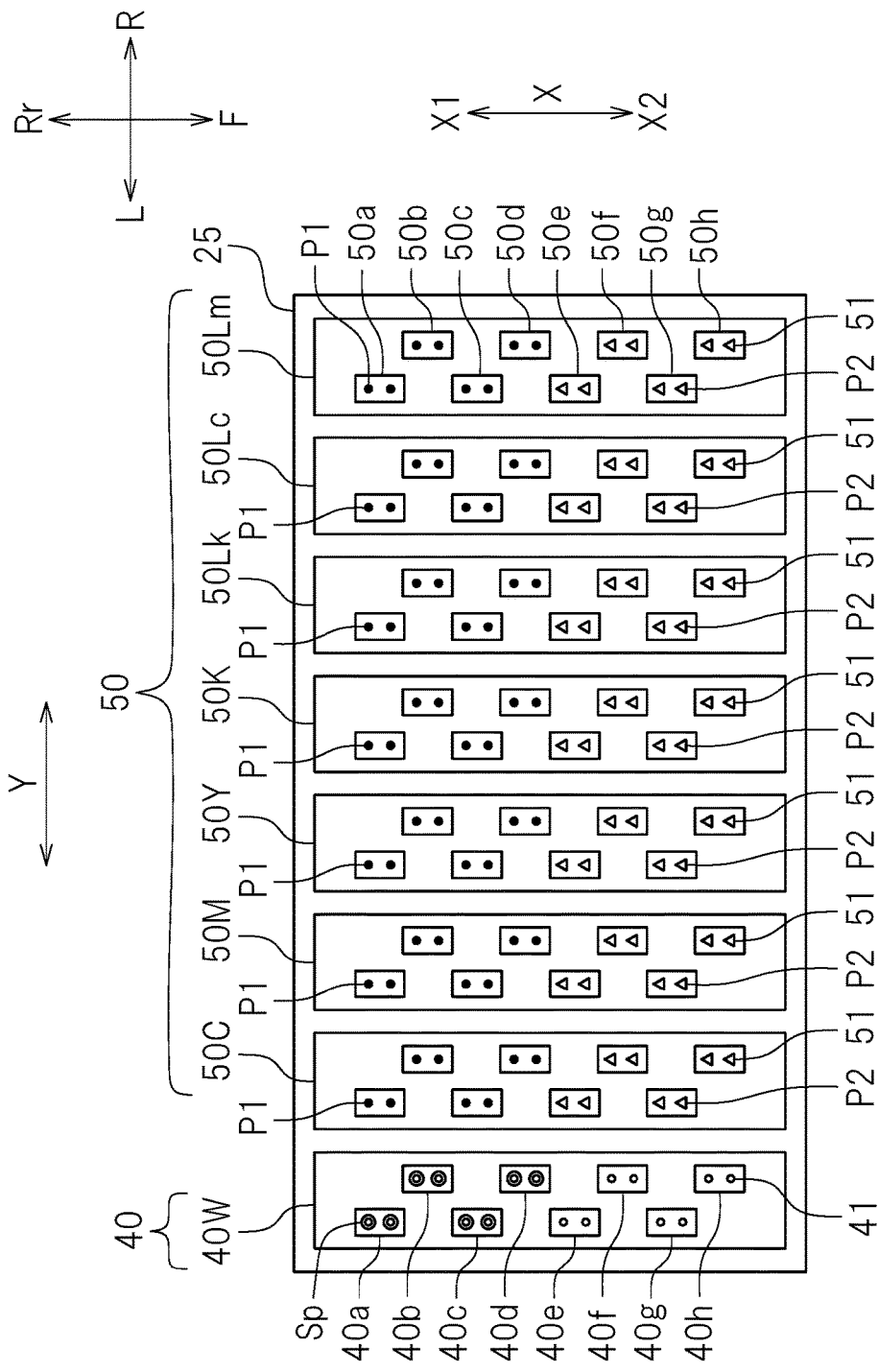
FIG. 5 is a schematic view showing a state of the carriage during first overlapping printing.

As described above, the screen processor 103 generates the first dot group P1, the second dot group P2, and the special color ink dots Sp, and the mode selector 102 sets the printing mode. After this, the overlapping printing is performed. Hereinafter, the printing process will be described in the case in which the "first overlapping printing" is performed as an example. FIG. 5 is a schematic view showing the carriage 25 during the "first overlapping printing". FIG. 5 is a view of the carriage 25 as seen from the upper side U. Among the nozzles in the ink heads shown FIG. 5, the nozzles ejecting the ink to print the first dot group P1 are represented by the hatched circles and reference sign P1. The nozzles ejecting the ink to print the second dot group P2 are represented by the triangles and reference sign P2. The nozzles ejecting the special color ink Sp are represented by the double circles. These nozzles are also represented by reference sign Sp.

As shown in FIG. 5, among the nozzles 41 of the ink head 40W included in the first ink head 40, the nozzles 41 included in the sub ink heads 40a, 40b, 40c and 40d eject the special color ink Sp. Among the nozzles 51 of the ink heads 50C through 50Lm provided as the second ink heads 50, the nozzles 51 included in the sub ink heads 50a, 50b, 50c and 50d eject the ink to print the first dot group P1. Among the nozzles 51 of the ink heads 50C through 50Lm provided as the second ink heads 50, the nozzles 51 included in the sub ink heads 50e, 50f, 50g and 50h eject the ink to print the second dot group P2. The sub ink heads 40a through 40d and the sub ink heads 50a through 50d are located on the upstream side X1 in the feeding direction X with respect to the sub ink heads 50e through 50h, and thus, are preferably used to print before the sub ink heads 50e through 50h. That is, the special color ink ejected from the nozzles 41 of the sub ink heads 40a through 40d and the process color ink ejected from the nozzles 51 of the sub ink heads 50a through 50d provide a printing layer below the process color ink ejected from the nozzles 51 of the sub ink heads 50e through 50h. In this manner, the printer 10 according to the present preferred embodiment continuously performs the "first overlapping printing".

In the case in which the "second overlapping printing" is selected, the sub ink heads on the upstream side and the sub ink heads on the downstream side have opposite roles to those of the "first overlapping printing". More specifically, the nozzles 51 of the sub ink heads 50a through 50d eject the process color ink to print the second dot group P2. The nozzles 41 of the sub ink heads 40e through 40h eject the special color ink Sp. The nozzles 51 of the sub ink heads 50e through 50h eject the process color ink to print the first dot group P1.

As described above, the "first dot group" provides the "first printing layer" together with the ink dots of the special color ink. The "first dot group" is included in an underlying layer that causes the image to appear to be thicker, and thus, the quality of the printed image thereof is not an important issue. Therefore, with the printer 10 according to the present preferred embodiment, the "first dot group" is generated by the screen processing using the dithering method, so that the load imposed by the image processing is reduced. In contrast, the "second dot group" directly provides the image. Therefore, the "second dot group" is generated by the screen processing using the error diffusion method, so that the image quality is high.

As described above, the printer 10 according to the present preferred embodiment generates, from the image data of the process color ink, the "first dot group" by the "first screen processing" and the "second dot group" by the "second screen processing". The printer 10 according to the present preferred embodiment provides the "first printing layer" of the ink dots of the "first dot group" and the ink dots of the special color ink. The printer 10 according to the present preferred embodiment further provides the "second printing layer" of the ink dots of the "second dot group", above or below the "first printing layer". As described above, a portion of the image is concurrently printed in the underlying color layer, and the image is printed as overlapping the underlying color layer, so that the image appears to be thicker. In this manner, a printed image appearing to have thickness and massiveness is able to be provided even by the overlapping printing.

With the printer 10 according to the present preferred embodiment, the "first screen processing" is set to be performed by a screen processing method that requires a smaller amount of data processing than the "second screen processing". The "first screen processing" is a process of generating the "first dot group", and the "second screen processing" is a process of generating the "second dot group". More specifically, the "first screen processing" uses the dithering method, and the "second screen processing" uses the error diffusion method. The "first screen processing" is set to be performed by a screen processing method that requires a smaller amount of data processing than the method of the "second screen processing", so that the load imposed by the image processing on the controller 100 is reduced.

The printer 10 according to the present preferred embodiment includes the mode selector 102. The mode selector 102 allows either one of the "first overlapping printing" and the "second overlapping printing" to be selected as a mode of overlapping printing. The "first overlapping printing" is a printing mode of printing the "first printing layer" as the lower layer and printing the "second printing layer" as the upper layer. The "second overlapping printing" is a printing mode of printing the "second printing layer" as the lower layer and printing the "first printing layer" as the upper layer. Since the mode selector 102 is included, the printer 10 according to the present preferred embodiment is usable for either the "first overlapping printing" or the "second overlapping printing".

In the present preferred embodiment, the generation of the "first dot group" uses the image data of the process color ink created by the color converter 101 as the original data. Alternatively, for example, a portion of the ink value may be extracted from the ink value of the image data of the process color ink created by the color converter 101, and the extracted ink value may be used as the original data to generate the "first dot group". The extraction is performed by, for example, multiplying the ink value of the image data of the process color ink created by the color converter 101 by a predetermined ratio. Alternatively, such an extracted ink value of one or each of a plurality of certain colors of process color ink may be used as the original data. This is applicable to the "second dot group".

Preferred Embodiment 2

In preferred embodiment 2 of the present invention, the "first dot group" and the "second dot group" may be generated from different image data. Except for this point, the printer 10 according to preferred embodiment 2 is preferably the same or substantially the same as the printer 1 according to preferred embodiment 1. Thus, in the description of preferred embodiment 2, the same components as those of preferred embodiment 1 will be denoted by the same reference signs, and overlapping descriptions will be omitted or simplified.

Figure 6:
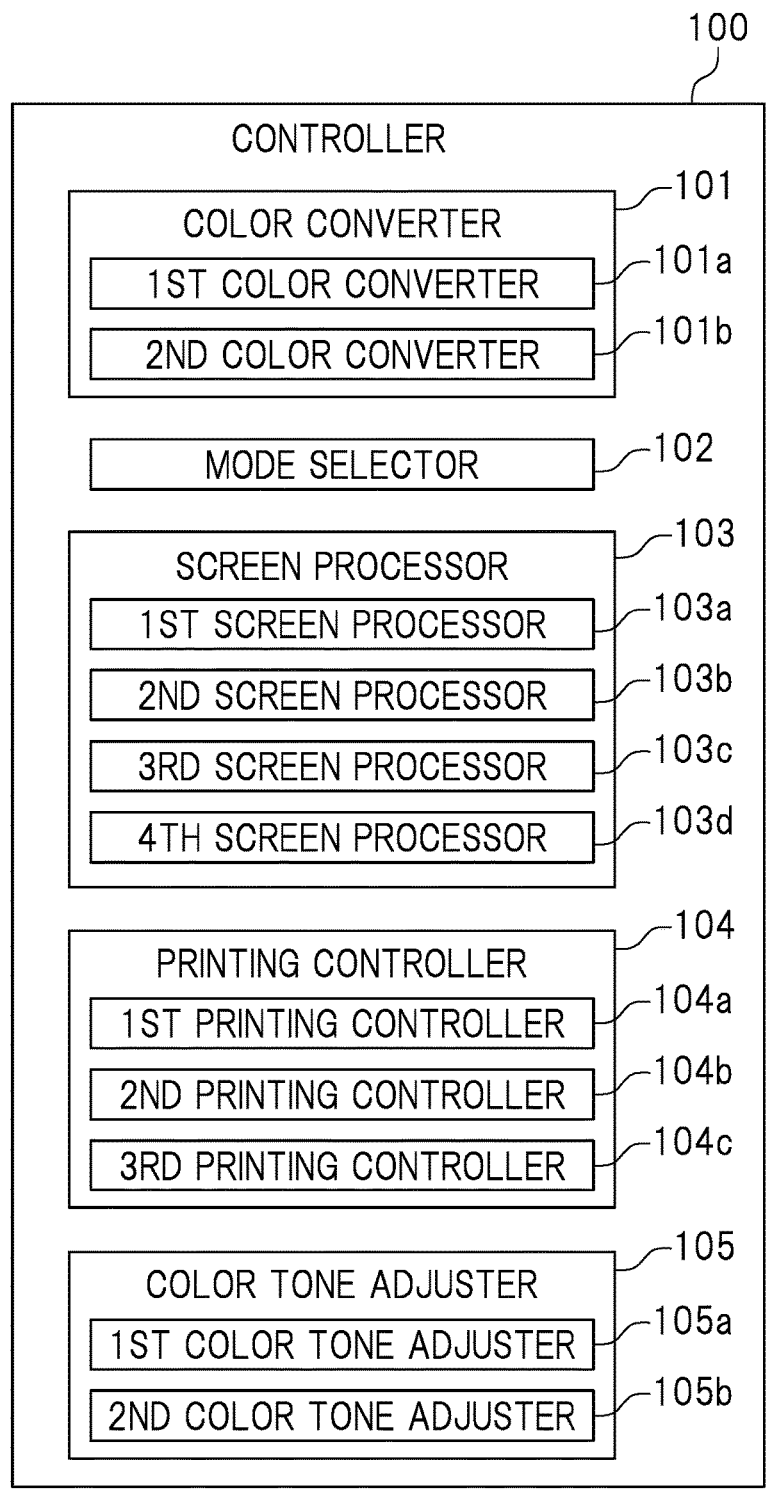
FIG. 6 is a block diagram of a controller according to preferred embodiment 2 of the present invention.

FIG. 6 is a block diagram of the controller 100 in the present preferred embodiment. As shown in FIG. 6, the color converter 101 in the present preferred embodiment includes a first color converter 101*a* and a second color converter 101*b*. The controller 100 includes a color tone adjuster 105. The color tone adjuster 105 includes a first color tone adjuster 105*a* and a second color tone adjuster 105*b*.

Figure 7:
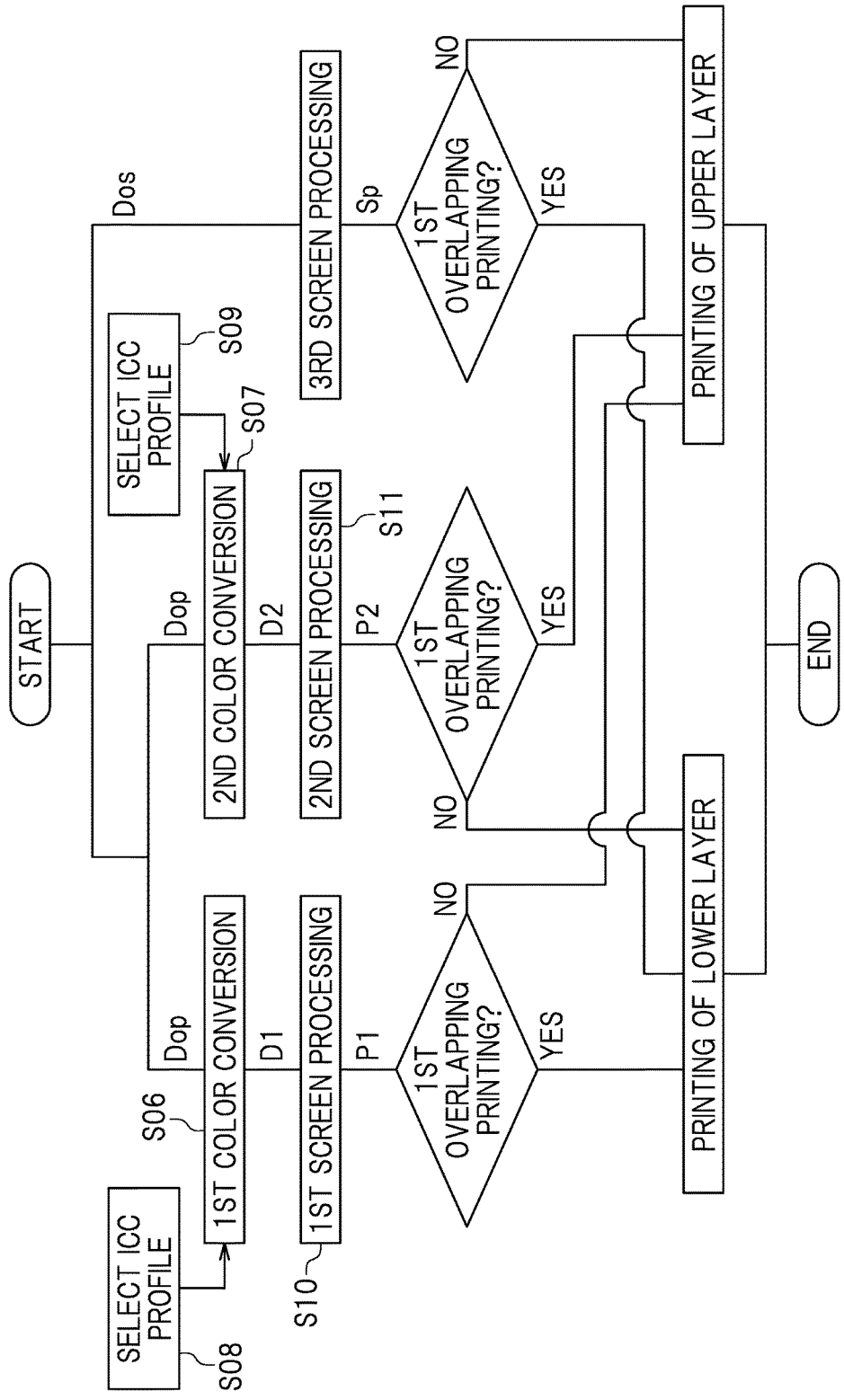
FIG. 7 is a flowchart of image processing according to preferred embodiment 2 of the present invention.

FIG. 7 is a flowchart of image processing in the present preferred embodiment. As shown in FIG. 7, the printer 10 according to the present preferred embodiment performs two types of color conversion in step S06 and step S07. The first color converter 101*a* performs "first color conversion" in step S06. In the "first color conversion", first image data D1, which is to be the original data from which the first dot group P1 is to be printed, is created. The second color converter 101*b* performs "second color conversion" in step S07. In the "second color conversion", second image data D2, which is to be the original data from which the second dot group P2 is to be printed, is created.

The ICC profile to be used in the "first color conversion" is selected by the first color tone adjuster 105*a*. The selection may be performed by the operator using an interface. Alternatively, the ICC profile to be used may be automatically selected in accordance with the type of the special color ink. As a further alternative, the ICC profile to be used may be set in a fixed manner. Similarly, the ICC profile to be used in the "second color conversion" is selected by the second color tone adjuster 105*b*. As described above, the ICC profile to be used in the "first color conversion" and the ICC profile to be used in the "second color conversion" are independently selected. Therefore, the ICC profile to be used in the "first color conversion" and the ICC profile to be used in the "second color conversion" may be different from each other. The selection of the ICC profiles is performed in step S08 and step S09 shown in FIG. 7.

Then, in step S10, the "first screen processing" is performed based on the first image data D1. In the "first screen processing", the first dot group P1 is generated. The "first screen processing" is preferably performed by, for example, the dithering method as in preferred embodiment 1. In step S11, the "second screen processing" is performed based on the second image data D2, and the second dot group P2 is generated. The "second screen processing" is preferably performed by, for example, the error diffusion method as in preferred embodiment 1.

In the case in which the "first color conversion" and the "second color conversion" are performed based on different ICC profiles, the first image data D1 created by the "first color conversion" and the second image data D2 created by the "second color conversion" have different color tones from each other. The first dot group P1 and the second dot group P2 generated based on such image data also have different color tones from each other. In the case in which the first dot group P1 and the second dot group P2 have different color tones from each other, the first dot group P1 and the second dot group P2 may have a mutually complementary relationship by which a color developed weakly in one of the dot groups is developed strongly in the other dot group. As a result, a higher quality image is able to be provided.

As described above, the printer 10 according to the present preferred embodiment may adjust the color tone of each of the "first dot group" and the "second dot group". This improves the degree of freedom in adjusting the quality of the printed image. The printer 10 according to the present preferred embodiment may, for example, adjust the color tone of the "first dot group" in accordance with the type of the special color ink. Alternatively, the color tone of the "first dot group" and the color tone of the "second dot group" may be different from each other, so that the "first dot group" and the "second dot group" may have a mutually complementary relationship.

Preferred Embodiment 3

In preferred embodiment 3 of the present invention, the "first dot group" and the "second dot group" are generated based on the ink dots of the process color ink generated by single screen processing. Thus, preferred embodiment 3 is different from preferred embodiment 1 and preferred embodiment 2 in the structure of the controller and the flow of the image processing. Preferred embodiment 3 preferably is the same or substantially the same as preferred embodiment 1 and preferred embodiment 2 in the physical structure. In the description of preferred embodiment 3, the same components as those of preferred embodiment 1 will be denoted by the same reference signs, and overlapping descriptions will be omitted or simplified.

Figure 8:
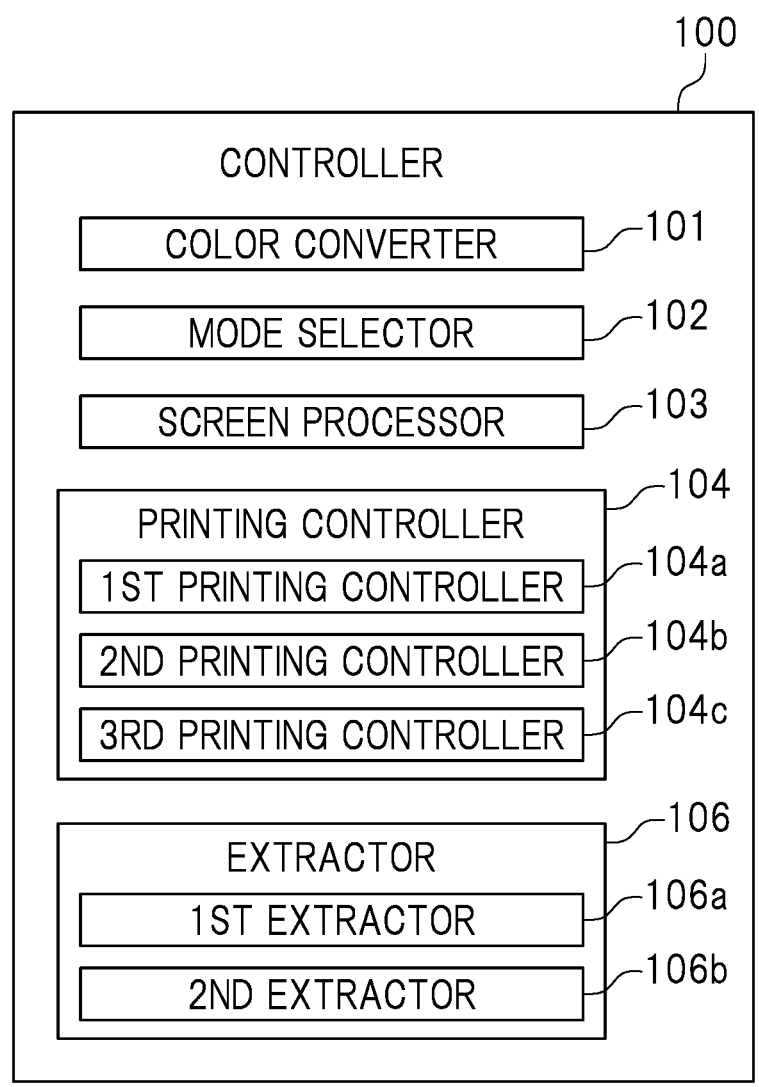
FIG. 8 is a block diagram of a controller according to preferred embodiment 3 of the present invention.

FIG. 8 is a block diagram of the controller 100 in the present preferred embodiment. As shown in FIG. 8, the controller 100 in the present preferred embodiment includes an extractor 106. The extractor 106 includes a first extractor 106*a* and a second extractor 106*b*.

The screen processor 103 in the controller 100 in the present preferred embodiment generates single ink dot data from the image data of the process color ink. In preferred embodiment 1 and preferred embodiment 2, the screen processing includes the "first screen processing" of generating the "first dot group" and the "second screen processing" of generating the "second dot group". In the present preferred embodiment, the screen processing on the image data of the process color ink is performed once.

Upon receipt of the data on the ink dot of the process color ink, the first extractor 106*a* performs "first extraction" of extracting the "first dot group" including a portion of, or the entirety of, the ink dots of the process color ink. Similarly, upon receipt of the data on the ink dot of the process color ink, the second extractor 106*b* performs "second extraction" of extracting the "second dot group" including a portion of, or the entirety of, the ink dots of the process color ink.

Figure 9:
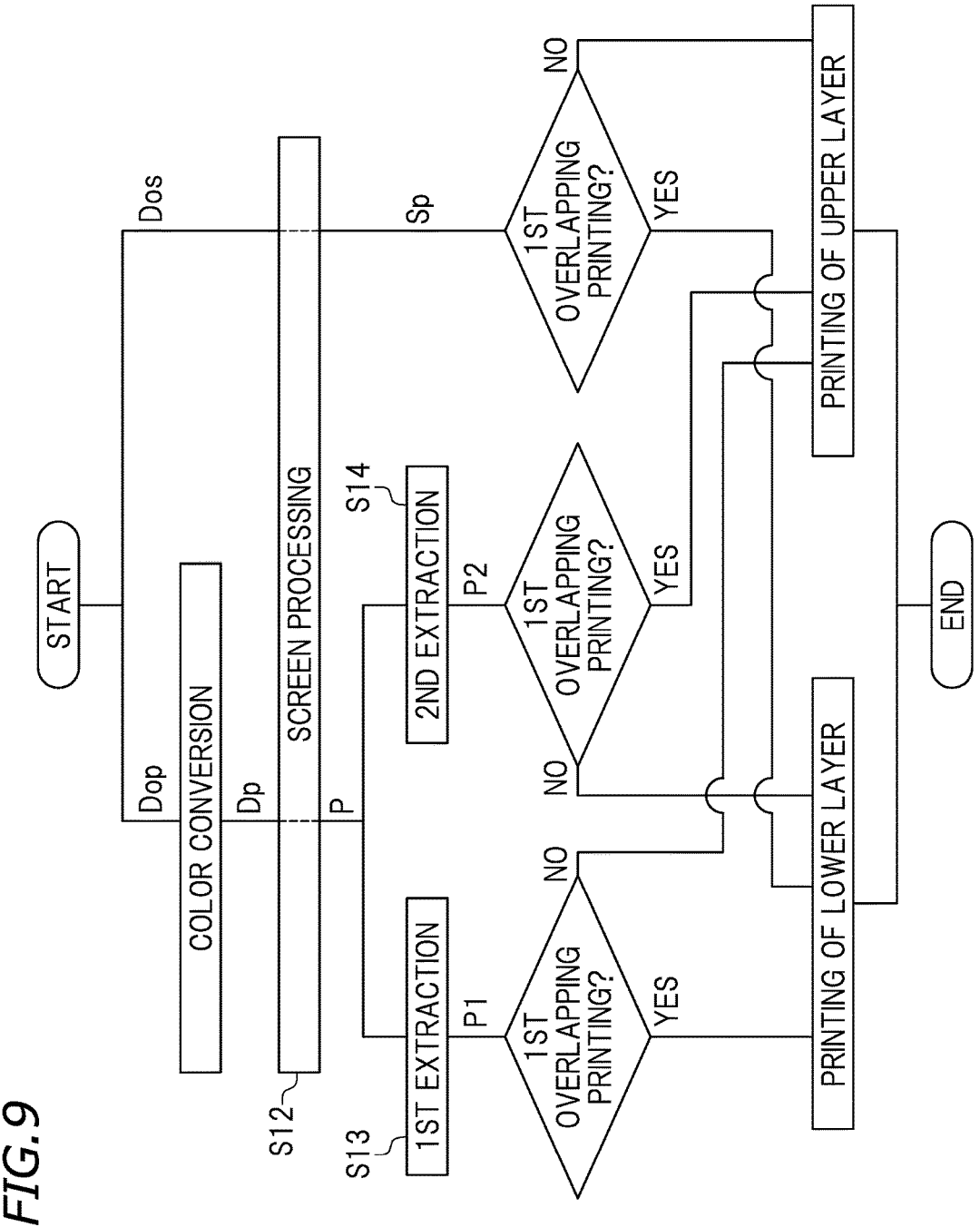
FIG. 9 is a flowchart of image processing according to preferred embodiment 3 of the present invention.

FIG. 9 is a flowchart of image processing in the present preferred embodiment. As shown in FIG. 9, image data Dp of the special color ink and the process color ink is subjected to screen processing and is converted into ink dot data P in step S12. In step S12, the screen processor 103 performs the screen processing. The ink dot data P of the process color ink generated in step S12 is subjected to the "first extraction" in step S13. The "first extraction" is a process of extracting a portion of the ink dots P of the process color ink using a specific mask. In the present preferred embodiment, a portion of the ink dot P of the process color ink is extracted using a dispersion dithering mask.

A dispersion dithering method is a dithering method of determining whether each of the dots is turned ON or OFF such that the dots are located in a dispersed manner. The dispersion dithering mask used in the dispersion dithering method has a threshold value set therein that determines whether each of the dots is turned ON or OFF such that the dots are dispersed. Therefore, the dot pattern provided by the dispersion dithering method includes the ink dots dispersed relatively uniformly. The first extractor 106a performs the "first extraction" on the ink dots P of the process color ink using the dispersion dithering mask. As a result of the "first extraction" performed on the ink dots of the process color ink, the first dot group P1 is generated.

In the present preferred embodiment, a blue noise mask is preferably used as the dispersion dithering mask, for example. The threshold value set in the blue noise mask determines whether each of the dots is turned ON or OFF such that the dots turned ON have blue noise characteristics. Unlike a random pattern mask, the blue noise mask achieves image extraction having a visually natural image although imposing a relatively light processing load.

As described above, the "first extraction" in the present preferred embodiment uses a dispersion dithering mask, especially, a blue noise mask, as a preferred mask. The mask is not limited to this. For example, a dispersion random dithering mask, a dithering mask causing the dots to be located regularly, or other suitable dithering mask may be used.

The second dot group P2 is also generated as a result of extraction from the ink dots P of the process color ink. In the present preferred embodiment, the second dot group P2 is extracted from the ink dots P of the process color ink by the second extractor 106b. The second extractor 106b performs the "second extraction" shown in step S14 shown in FIG. 9 to generate the second dot group P2. In the present preferred embodiment, the "second extraction" is a process of extracting the ink dots P of the process color ink remaining after the ink dots P are extracted to form the first dot group P. That is, the sum of the first dot group P1 and the second dot group P2 matches the ink dots P of the process color ink.

In the case in which the "first dot group" and the "second dot group" are extracted such that the sum of the groups matches the ink dots of the process color ink, all of the dots of the process color ink are printed on the recording medium 5 at the time when the printing is finished. The dispersion dithering mask may be used to extract the "first dot group", so that the "first dot group" reflects the features of the original image while the calculation load is reduced. The blue noise mask may be used as the dispersion dithering mask, so that the features of the original image are reflected more effectively while the calculation load is reduced.

In a modification of preferred embodiment 3 of the present invention, the "second extraction" extracts all of the ink dots of the process color ink as the "second dot group". More specifically, where the entirety of the ink dots of the process color ink is 100%, the "second dot group" may be set to 100%. According to this modification, in the case in which, for example, about 20% of the ink dots of the process color ink is extracted as the "first dot group", the sum of the ratios of the ink dots of the "first dot group" and the "second dot group" is about 120% because 100% of the ink dots is used as the "second dot group". Thus, the printer 10 according to this modification prints an image that appears to be thicker. Therefore, the printed image in a finished state is expected to be clearer. This type of printing extends the range of colors that may be represented by the same printer by using the same types of ink (so-called color gamut).

Some preferred embodiments of the present invention and the technology thereof have been described. The above-described preferred embodiments are merely examples, and the technology disclosed herein may be implemented and performed in any of various applications.

For example, in preferred embodiment 1 and preferred embodiment 2, preferably, the "first screen processing" uses the dithering method and the "second screen processing" uses the error diffusion method. The screen processing methods of the "first screen processing" and the "second screen processing" are not limited to these method. There are many screen processing methods. In the case in which the "first screen processing" and the "second screen processing" are performed by different methods, the "second screen processing" may be performed by, for example, a method by which the ink dots are generated at a lower density than that in the "first screen processing". In the case in which the density of the ink dots is lower, the image processing amount is generally smaller, and thus, the load on the printer 10 is lighter. The "first screen processing" and the "second screen processing" do not need to be performed by different methods or by use of different threshold values, and may be of the same type.

According to the "overlapping printing" in the above-described preferred embodiments, two layers, that is, a lower layer and an upper layer, are printed in an overlapping state. Alternatively, three or more layers may be printed in an overlapping state. For example, three layers of an underlying color layer, an image layer, and a top coat, may be printed in an overlapping state. In this case, the top coat may be, for example, transparent ink. In the case in which three or more layers are printed in an overlapping state, three or more dot groups may be generated of the ink dots of the process color ink, instead of only the "first dot group" and the "second dot group". In this case, the printer 10 may include another screen processor generating "another dot group" by screen processing or may include another extractor generating the "another dot group" by extraction.

In the above-described preferred embodiments, preferably, the first ink head 40 and the second ink heads 50C through 50Lm each include a plurality of sub ink heads, and the sub ink heads are located in a staggered arrangement in two lines in the corresponding ink head. The positional arrangement of the sub ink heads in each ink head is not limited to the above-described arrangement. The sub ink heads may be arrayed as shown in, for example, FIG. 10. In the positional arrangement shown in FIG. 10 as seen at the bottom surface of the carriage 25, the sub ink heads are preferably arrayed in one line in the feeding direction X in each ink head.

Figure 10:
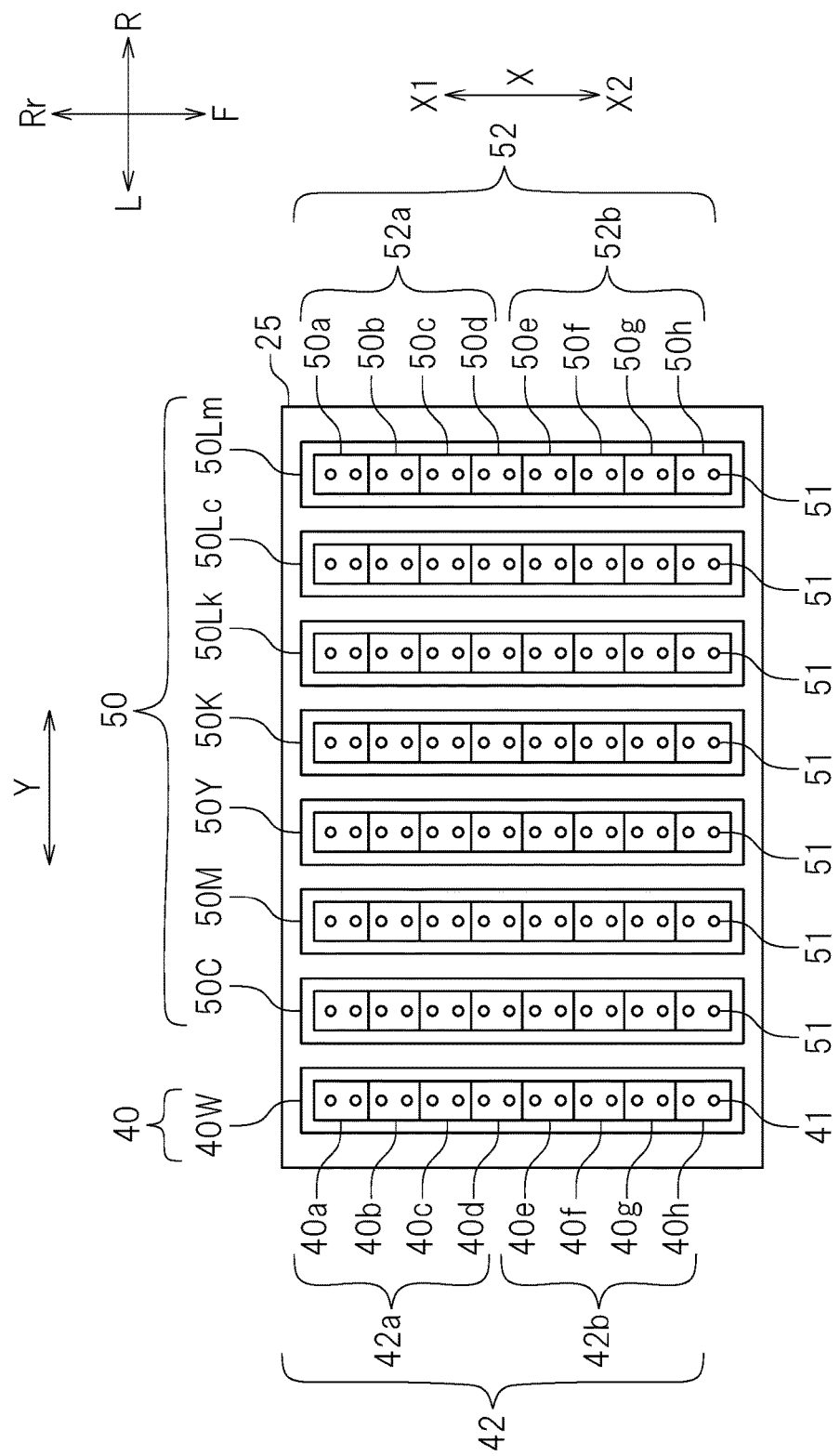
FIG. 10 is a schematic view showing a structure of a bottom surface of a carriage different from the carriage according to preferred embodiments 1 through 3 of the present invention.

In the preferred embodiment shown in FIG. 10, the first ink head 40 includes the plurality of sub ink heads 40a through 40h arrayed in one line in the feeding direction X. The sub ink heads 40a through 40h each include the plurality of nozzles 41 arrayed in one line in the feeding direction X. Therefore, the nozzles 41 define a nozzle array 42 extending in one line in the feeding direction X. The nozzle array 42 is divided into a first upstream nozzle array 42a located on the upstream side X1 in the feeding direction X and a first downstream nozzle array 42b located on the downstream side X2 in the feeding direction X. The first upstream nozzle array 42*a* includes the nozzles 41 in the four sub ink heads 40*a*, 40*b*, 40*c* and 40*d* located on the upstream side X1 in the feeding direction X. The first downstream nozzle array 42*b* includes the nozzles 41 in the four sub ink heads 40*e*, 40*f*, 40*g* and 40*h* located on the downstream side X2 in the feeding direction X. The number of the nozzles 41 in the first upstream nozzle array 42*a* and the number of the nozzles 41 in the first downstream nozzle array 42*b* are preferably equal to each other. The first upstream nozzle array 42*a* and the first downstream nozzle array 42*b* are distinguished as described above for the purpose of control, and do not have any structural difference.

In the preferred embodiment shown in FIG. 10, the plurality of second ink heads 50C, 50M, 50Y, 50K, 50Lk, 50Lc and 50Lm each preferably include the plurality of sub ink heads 50*a* through 50*h* arrayed in one line in the feeding direction X. The sub ink heads 50*a* through 50*h* each include the plurality of nozzles 51 arrayed in one line in the feeding direction X. Therefore, in each of the ink heads 50C, 50M, 50Y, 50K, 50Lk, 50Lc and 50Lm, the nozzles 51 define a nozzle array 52 extending in one line in the feeding direction X. The nozzle array 52 is divided into a second upstream nozzle array 52*a* located on the upstream side X1 in the feeding direction X and a second downstream nozzle array 52*b* located on the downstream side X2 in the feeding direction X. The second upstream nozzle array 52*a* includes the nozzles 51 in the four sub ink heads 50*a*, 50*b*, 50*c* and 50*d* located on the upstream side X1 in the feeding direction X. The second downstream nozzle array 52*b* includes the nozzles 51 in the four sub ink heads 50*e*, 50*f*, 50*g* and 50*h* located on the downstream side X2 in the feeding direction X. The number of the nozzles 51 in the second upstream nozzle array 52*a* and the number of the nozzles 51 in the second downstream nozzle array 52*b* are preferably equal or substantially equal to each other. The second upstream nozzle array 52*a* and the second downstream nozzle array 52*b* are distinguished as described above also for the purpose of control, and do not have any structural differences. The nozzles 51 in each of the ink heads 50C, 50M, 50Y, 50K, 50Lk, 50Lc and 50Lm are arrayed at positions matched, in the feeding direction X, to the positions of the nozzles 41 in the ink head 40W included in the first ink head 40.

Figure 11:
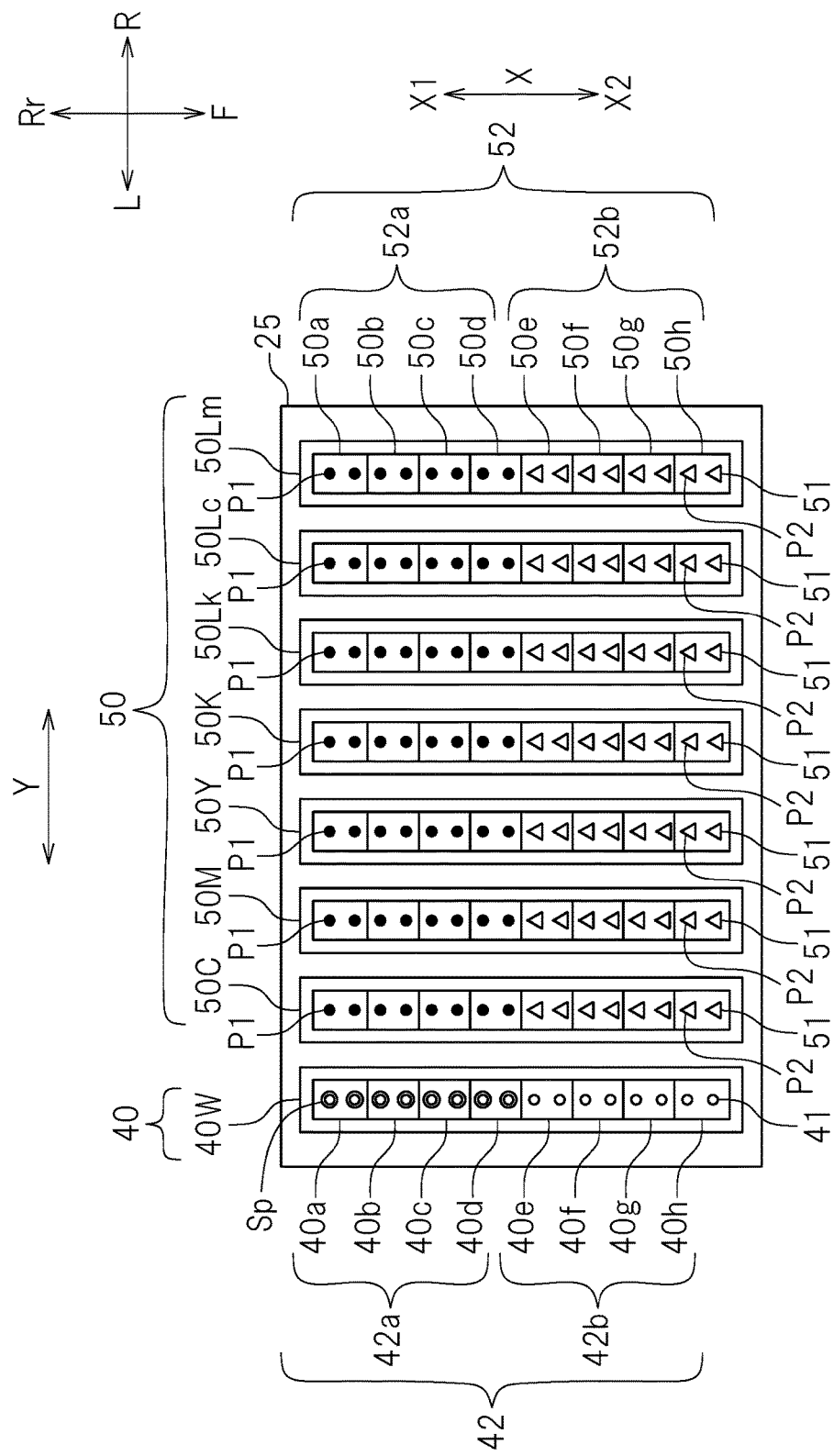
FIG. 11 is a schematic view showing a state of ink ejection while a printer 1 shown in FIG. 10 is performing first overlapping printing.

FIG. 11 is a schematic view showing the state of ink ejection while the printer 10 is performing the "first overlapping printing". Like FIG. 5, FIG. 11 is a view of the carriage 25 as seen from the upper side U. The symbols representing the ink in FIG. 11 are the same as those in FIG. 5. More specifically, in FIG. 11, the nozzles ejecting the ink to provide the first dot group P1 are represented by the hatched circles and reference sign P1. The nozzles ejecting the ink to provide the second dot group P2 are represented by the triangles and reference sign P2. The nozzles ejecting the special color ink SP are represented by the double circles. These nozzles are also represented by reference sign Sp.

As shown in FIG. 11, among the nozzles 41 of the ink head 40W included in the first ink head 40, the nozzles 41 included in the first upstream nozzle array 42*a* eject the special color ink Sp. Among the nozzles 51 of the ink heads 50C through 50Lm provided as the second ink heads 50, the nozzles 51 included in the second upstream nozzle array 52*a* eject the ink to provide the first dot group P1. Among the nozzles 51 of the ink heads 50C through 50Lm provided as the second ink heads 50, the nozzles 51 included in the second downstream nozzle array 52*b* eject the ink to provide the second dot group P2. The first upstream nozzle array 42*a* and the second upstream nozzle array 52*a* are located on the upstream side X1 in the feeding direction X with respect to the second downstream nozzle array 52*b*, and thus, are preferably used to print before the second downstream nozzle array 52*b*. That is, the ink ejected from the first upstream nozzle array 42*a* and the second upstream nozzle array 52*a* provide a printing layer below the ink ejected from the second downstream nozzle array 52*b*. In this manner, the printer 10 according to the present preferred embodiment continuously performs the "first overlapping printing".

In the case in which the "second overlapping printing" is selected, the sub ink heads on the upstream side and the sub ink heads on the downstream side have opposite roles to those of the "first overlapping printing". More specifically, the nozzles 51 of the second downstream nozzle array 52*a* eject the process color ink to provide the second dot group P2. The nozzles 41 of the first downstream nozzle array 42*b* eject the special color ink Sp. The nozzles 51 of the second downstream nozzle array 52*b* eject the process color ink to provide the first dot group P1.

In the case in which an odd number of sub ink heads are provided in an ink head and, thus, the sub ink heads are not equally divided into two, one of the sub ink heads may not be used, for example. The sub ink head not to be used may be the sub ink head located at the end on the upstream side X1, or on the downstream side X2, in the feeding direction X among the sub ink heads included in the ink head. Alternatively, the nozzles in the sub ink head through which the border line, equally dividing the nozzle array into two in the feeding direction X, passes may be divided by the border line into two, that is, into the nozzle(s) on the upstream side X1 and the nozzle(s) on the downstream side X2.

The ink heads in the carriage 25 may be disposed in a different positional arrangement. For example, the first ink head 40 and the plurality of second ink heads 50 may be offset in the feeding direction X. In the case in which the first ink head 40 and the second ink heads 50 are completely offset in the feeding direction X, the nozzle array in each ink head are not divided into the upstream nozzle array and the downstream nozzle array. In this case, all of the nozzles in the ink head are preferably used. In the case in which the first ink head 40 and the second ink heads 50 are partially offset in the feeding direction X, the number of the usable nozzles is smaller than in the case in which the ink heads are completely offset, but the carriage 25 may be made compact. Alternatively, the first ink head 40 and the second ink heads 50 may be mounted on, and may be movable by, different carriages. Still alternatively, the printing of the "first printing layer" and the printing of the "second printing layer" may be performed in completely different steps.

In the above-described preferred embodiments, the ink is preferably ejected by a piezo-driving system of changing the volume of the pressure chamber by the displacement of the piezoelectric element. Alternatively, the printer according to a preferred embodiment of the present invention may use, for example, any of continuous systems, such as a binary deflection system, a continuous deflection system and other suitable systems, or any of on-demand systems including a thermal system and other suitable systems. There is no limitation on the ink ejection system according to preferred embodiments of the present invention.

In the above-described preferred embodiments, the carriage 25 moves in the scanning direction Y whereas the recording medium 5 moves in the feeding direction X. The printer according to a preferred embodiment of the present invention is not limited to such a system. The movement of the carriage 25 and the recording medium 5 are relative, and either one of the carriage 25 and the recording medium 5 may be moved in the scanning direction Y or the feeding direction X. For example, the recording medium 5 may be unmovable whereas the carriage 25 may be movable in both of the scanning direction X and the feeding direction X. Alternatively, both of the carriage 25 and the recording medium 5 may be movable in both of the directions.

The technology disclosed herein is applicable to any of various types of inkjet printers. The technology disclosed herein is applicable to a roll-to-roll printer in which a roll recording medium 5 is fed as described in the above-described preferred embodiments, or to a flat-bed inkjet printer, for example. The printer 10 is not limited to a printer that is independently usable, and may be a printer that is combined with another device. For example, the printer 10 may be incorporated into another device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which may be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An inkjet printer, comprising:
   a first ink head including a plurality of nozzles through which a first ink is ejected towards a recording medium to form ink dots of the first ink on the recording medium;
   a second ink head including a plurality of nozzles through which a second ink is ejected towards the recording medium to form ink dots of the second ink on the recording medium;
   a moving mechanism to move the first ink head and the second ink head, and the recording medium, with respect to each other; and
   a controller connected with the first ink head, the second ink head, and the moving mechanism to control the first ink head, the second ink head, and the moving mechanism; wherein
   the controller includes:
     a first screen processor to perform first screen processing on image data of the second ink to generate a first dot group including ink dots of the second ink;
     a second screen processor to perform second screen processing on image data of the second ink to generate a second dot group including ink dots of the second ink;
     a third screen processor to perform third screen processing on image data of the first ink to generate ink dots of the first ink;
     a first printing controller to form, on the recording medium, a first printing layer of the ink dots of the first ink and the ink dots of the first dot group; and
     a second printing controller to form a second printing layer of the ink dots of the second dot group, above or below the first printing layer; and
   the first screen processing is a screen processing that generates the ink dots with a smaller amount of data processing than the second screen processing.

2. The inkjet printer according to claim 1, wherein
   the first ink is a special color ink; and
   the second ink is a process color ink.

3. The inkjet printer according to claim 1, wherein the first screen processing is a screen processing that generates the ink dots at a density lower than the second screen processing.

4. The inkjet printer according to claim 1, wherein
   the first screen processing is a screen processing by a dithering method; and
   the second screen processing is screen processing by an error diffusion method.

5. The inkjet printer according to claim 1, wherein the controller includes a mode selector to select any one of a plurality of printing modes including a first printing mode of printing the first printing layer below the second printing layer and a second printing mode of printing the first printing layer above the second printing layer.

6. The inkjet printer according to claim 1, wherein
   the moving mechanism includes a feeding mechanism to feed the recording medium;
   the first ink head and the second ink head are located side by side in a scanning direction perpendicular or substantially perpendicular to a feeding direction in which the recording medium is fed;
   the first ink head includes:
     a first upstream nozzle array including a portion of the plurality of nozzles arrayed in the feeding direction; and
     a first downstream nozzle array including another portion of the plurality of nozzles arrayed in the feeding direction, the first downstream nozzle array being located downstream with respect to the first upstream nozzle array in the feeding direction;
   the second ink head includes:
     a second upstream nozzle array including a portion of the plurality of nozzles arrayed in the feeding direction; and
     a second downstream nozzle array including another portion of the plurality of nozzles arrayed in the feeding direction, the second downstream nozzle array being located downstream with respect to the second upstream nozzle array in the feeding direction;
   the first printing controller:
     in a case in which the first printing layer is to be printed below the second printing layer, causes the nozzles of the first upstream nozzle array to eject the first ink, and causes the nozzles of the second upstream nozzle array to eject the second ink to form the ink dots of the first dot group, to print the first printing layer; and in a case in which the first printing layer is to be formed above the second printing layer, causes the nozzles of the first downstream nozzle array to eject the first ink, and causes the nozzles of the second downstream nozzle array to eject the second ink to form the ink dots of the first dot group, to form the first printing layer; and the second printing controller:
in the case in which the first printing layer is to be printed below the second printing layer, causes the nozzles of the second downstream nozzle array to eject the second ink to form the ink dots of the second dot group, to form the second printing layer; and
in the case in which the first printing layer is to be formed above the second printing layer, causes the nozzles of the second upstream nozzle array to eject the second ink usable to form the ink dots of the second dot group, to form the second printing layer.

7. An inkjet printer comprising:
a first ink head including a plurality of nozzles through which a first ink is ejected towards a recording medium to form ink dots of the first ink on the recording medium;
a second ink head including a plurality of nozzles through which a second ink is ejected towards the recording medium to form ink dots of the second ink on the recording medium;
a moving mechanism to move the first ink head and the second ink head, and the recording medium, with respect to each other; and
a controller connected with the first ink head, the second ink head, and the moving mechanism to control the first ink head, the second ink head, and the moving mechanism; wherein
the controller includes:
a first screen processor to perform first screen processing on image data of the second ink to generate a first dot group including ink dots of the second ink;
a second screen processor to perform second screen processing on image data of the second ink to generate a second dot group including ink dots of the second ink;
a third screen processor to perform third screen processing on image data of the first ink to generate ink dots of the first ink;
a first printing controller to form, on the recording medium, a first printing layer of the ink dots of the first ink and the ink dots of the first dot group;
a second printing controller to form a second printing layer of the ink dots of the second dot group, above or below the first printing layer;
a first color converting processor that applies a first color conversion to an input image of the second ink to create first image data; and
a second color converting processor that applies a second color conversion to an input image of the second ink to create second image data;
the first screen processor performs the first screen processing on the first image data to generate the first dot group; and
the second screen processor performs the second screen processing on the second image data to generate the second dot group.

8. The inkjet printer according to claim 7, wherein the second color conversion is a color conversion different from the first color conversion.

9. The inkjet printer according to claim 7, wherein
the first ink is a special color ink; and
the second ink is a process color ink.

10. The inkjet printer according to claim 7, wherein the controller includes a mode selector to select any one of a plurality of printing modes including a first printing mode of printing the first printing layer below the second printing layer and a second printing mode of printing the first printing layer above the second printing layer.

11. The inkjet printer according to claim 7, wherein
the moving mechanism includes a feeding mechanism to feed the recording medium;
the first ink head and the second ink head are located side by side in a scanning direction perpendicular or substantially perpendicular to a feeding direction in which the recording medium is fed;
the first ink head includes:
a first upstream nozzle array including a portion of the plurality of nozzles arrayed in the feeding direction; and
a first downstream nozzle array including another portion of the plurality of nozzles arrayed in the feeding direction, the first downstream nozzle array being located downstream with respect to the first upstream nozzle array in the feeding direction;
the second ink head includes:
a second upstream nozzle array including a portion of the plurality of nozzles arrayed in the feeding direction; and
a second downstream nozzle array including another portion of the plurality of nozzles arrayed in the feeding direction, the second downstream nozzle array being located downstream with respect to the second upstream nozzle array in the feeding direction;
the first printing controller:
in a case in which the first printing layer is to be printed below the second printing layer, causes the nozzles of the first upstream nozzle array to eject the first ink, and causes the nozzles of the second upstream nozzle array to eject the second ink to form the ink dots of the first dot group, to print the first printing layer; and
in a case in which the first printing layer is to be formed above the second printing layer, causes the nozzles of the first downstream nozzle array to eject the first ink, and causes the nozzles of the second downstream nozzle array to eject the second ink to form the ink dots of the first dot group, to form the first printing layer; and
the second printing controller:
in the case in which the first printing layer is to be printed below the second printing layer, causes the nozzles of the second downstream nozzle array to eject the second ink to form the ink dots of the second dot group, to form the second printing layer; and
in the case in which the first printing layer is to be formed above the second printing layer, causes the nozzles of the second upstream nozzle array to eject the second ink usable to form the ink dots of the second dot group, to form the second printing layer.

* * * * *